United States Patent
Jeong et al.

(10) Patent No.: US 12,432,771 B2
(45) Date of Patent: Sep. 30, 2025

(54) METHOD AND DEVICE FOR STORING AND REPORTING RANDOM ACCESS INFORMATION IN NEXT-GENERATION MOBILE COMMUNICATION SYSTEM

(71) Applicant: Samsung Electronics Co., Ltd., Suwon-si (KR)

(72) Inventors: Seungbeom Jeong, Suwon-si (KR); Soenghun Kim, Suwon-si (KR); Anil Agiwal, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 433 days.

(21) Appl. No.: 17/995,628

(22) PCT Filed: Apr. 8, 2021

(86) PCT No.: PCT/KR2021/004450
§ 371 (c)(1),
(2) Date: Oct. 6, 2022

(87) PCT Pub. No.: WO2021/206487
PCT Pub. Date: Oct. 14, 2021

(65) Prior Publication Data
US 2023/0217485 A1 Jul. 6, 2023

(30) Foreign Application Priority Data

Apr. 9, 2020 (KR) .................. 10-2020-0043537
Apr. 9, 2020 (KR) .................. 10-2020-0043594
Apr. 8, 2021 (KR) .................. 10-2021-0046121

(51) Int. Cl.
*H04W 74/04* (2009.01)
*H04B 17/318* (2015.01)
(Continued)

(52) U.S. Cl.
CPC .......... *H04W 74/04* (2013.01); *H04B 17/318* (2015.01); *H04W 16/28* (2013.01); *H04W 24/10* (2013.01); *H04W 74/0833* (2013.01); *H04W 74/0866* (2013.01); *H04W 74/0838* (2024.01)

(58) Field of Classification Search
CPC ............. H04W 74/04; H04W 74/0833; H04W 74/0866; H04W 74/0838; H04W 16/28; H04W 24/10; H04B 17/318
See application file for complete search history.

(56) References Cited

U.S. PATENT DOCUMENTS

2019/0069322 A1    2/2019  Davydov et al.
2019/0364599 A1*  11/2019  Islam ................... H04L 5/0048
(Continued)

FOREIGN PATENT DOCUMENTS

KR    10-2020-0127405 A    11/2020
WO       2019100254 A1      5/2019
WO    WO-2021206487 A1 *  10/2021    ........... H04B 17/318

OTHER PUBLICATIONS

Jeong et al., WO 2021/06487 A1, Method For Storing And Reporting Random Access Information in a Next-generation Mobile Communication System, Oct. 14, 2021, 28 Pages. (Year: 2021).*

(Continued)

*Primary Examiner* — Brian J. Gillis
*Assistant Examiner* — Chhian (Amy) Ling

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety (Continued)

services. The present invention discloses a method performed by a UE in a wireless communication system, the method includes storing first resource information related to a contention-based random access (CBRA) and second resource information related to a contention-free random access (CFRA); receiving, from a base station, a first message for requesting random access related information of the terminal; and transmitting, to the base station, a second message including the stored first resource information and the stored second resource information in response to the first message.

15 Claims, 23 Drawing Sheets

(51) Int. Cl.
    *H04W 16/28*    (2009.01)
    *H04W 24/10*    (2009.01)
    *H04W 74/08*    (2024.01)
    *H04W 74/0833*  (2024.01)
    *H04W 74/0838*  (2024.01)

(56) References Cited

U.S. PATENT DOCUMENTS

2020/0351731 A1    11/2020  Kim et al.
2023/0077603 A1*    3/2023  Qiu .................. H04W 74/0833
                                                            370/329

OTHER PUBLICATIONS

Supplementary European Search Report dated Jun. 30, 2023, in connection with European Patent Application No. 21784468.7, 10 pages.
3GPP TR 37-816 V16.0.0 (Jul. 2019), Technical Report, 3rd Generation Partnership Project; Technical Specification Group Radio Access Network; Study on RAN-centric data collection and utilization for LTE and NR (Release 16), Jul. 2019, 35 pages.
3GPP TS 38-321 V15.8.0 (Dec. 2019), Technical Specification, 3rd Generation Partnership Project; Technical Specification Group Radio Access Network; NR; Medium Access Control (MAC) protocol specification (Release 15), Dec. 2019, 78 pages.
3GPP TS 38.331 V16.6.0 (Sep. 2021), Technical Specification, 3rd Generation Partnership Project; Technical Specification Group Radio Access Network; NR; Radio Resource Control (RRC) protocol specification (Release 16), Sep. 2021, 961 pages.
Ericsson, "TP on solutions for RACH optimisation," R3-193063, 3GPP TSG-RAN WG2 #104, Reno, Nevada, US, May 13-17, 2019, 3 pages.
Nokia, et al., "RACH report contents for Normal Uplink (NUL) and Supplementary Uplink (SUL)," R2-1910718, 3GPP TSG-RAN WG2 Meeting #107, Prague, Czech Republic, Aug. 26-30, 2019, 4 pages.
Samsung, "Corrections to RA Report: [S480] [S481] [S482] [S483] [S484] [S485]," R2- 2002562, 3GPP TSG-RAN2 Meeting #109bis Electronic, Apr. 20-24, 2020, 27 pages.
International Search Report and Written Opinion of the International Searching Authority dated Jul. 9, 2021 in connection with International Application No. PCT/KR2021/004450, 9 pages.
Ericsson, "Summary of CP open issues," Tdoc R2-2001917, 3GPP TSG-RAN WG2 #109 electronic, Elbonia, USA, Nov. 18-22, 2019, 9 pages.
Huawei, et al., "CR for introducing MDT and SON," R2-2002003, 3GPP TSG-RAN WG2 Meeting #109-e, Electronic meeting, Feb. 24-Mar. 6, 2020, 577 pages.
Samsung, "Inter-RAT RLF reporting for MRO," R2-2001444, 3GPP TSG-RAN WG2 Meeting #109-e, Online, Feb. 24-Mar. 6, 2020, 9 pages.
3GPP TS 38.331 V15.9.0 (Mar. 2020), Technical Specification, 3rd Generation Partnership Project; Technical Specification Group Radio Access Network; NR; Radio Resource Control (RRC) protocol specification (Release 15), Mar. 2020, 536 pages.

* cited by examiner

FIG. 10A

```
VarRLF-Report-r16 ::=        SEQUENCE {
    rlf-Report-r16              RLF-Report-r16,
    plmn-IdentityList-r16       RLMN-IdentityList-r16,
}

RLF-Report-r16 ::=          CHOICE {
    nr-RLF-Report-16            SEQUENCE {
        measResultLastServCell-r16      MeasResultRLFNR-r16,
        measResultNeighCells-r16        SEQUENCE {
            measResultListNR-r16            MeasResultList2NR-r16,           OPTIONAL,
            measResultListEUTRA-r16         MeasResultList2EUTRA-r16,        OPTIONAL,
        }                                                                   OPTIONAL,
        c-RNTI-r16                      RNTI-Vslue,
        previousPCellID-r16             CGI-Info-LoggingDetailed-r16        OPTIONAL,
        failedPCellID-r16               CHOICE {
            cellGlobalID-r16                CGI-Info-LoggingDetailed-r16
            pci-arfcn-r16                   SEQUENCE {
                physCellID,
                ARFCN-ValueNR
            }
            carrierFreq-r16
        }
        reeatablishmentCellID-r16       CGI-Info-Logging-r16                OPTIONAL,
        timeConnFailure-r16             INTEGER (0..1023)                   OPTIONAL,
        timeSinceFailure-r16            TimeSinceFailure-r16,
        connectionFailureType-r16       ENUMERATED {rlf, hof}               OPTIONAL,
        rlf-Cause-r16                   ENUMERATED {
            t310-Expiry, randomAccessProblem,
            r1c-MaxNumRetx, beamFailureRecoveryFailure, apare4, spare3, spare2, spare1},
        locationInfo-r16                LocationInfo-r16                    OPTIONAL,
        absoluteFrequencyPointA-r16     ARFCN-ValueNR                       OPTIONAL,
        locationAndBandwidth-r16        INTEGER (0..37949)                  OPTIONAL,
        subcarrierSpacing-r16           subcarrierSpacing
        msg1-FrequencyStart-r16         INTEGER (0..maxNrofPhysicalResourceBlocks-1}  OPTIONAL
        msg1-SubcarrierSpacing-r16      SubcarrierSpacing OPTIONAL
        msg1-FDM-r16                    ENUMERATED {one, two, four, eight}  OPTIONAL,
        perRAInfoList-r16               PerRAInfoList-r16                   OPTIONAL,
        noSuitableCellFound-r16         ENUMERATED {true}
    },
    eutra-RLF-Report-r16            SEQUENCE {
        failedPCellID-EUTRA             CGI-InfoEUTRALogging,
        measResult-RLF-Report-EUTRA-r16 OCTET STRING
    }
}
```

10-05 → VarRLF-Report-r16 block 10-55 → msg1-FrequencyStart/SubcarrierSpacing
10-10 → msg1-FDM-r16

A →

METHOD AND DEVICE FOR STORING AND REPORTING RANDOM ACCESS INFORMATION IN NEXT-GENERATION MOBILE COMMUNICATION SYSTEM

CROSS-REFERENCE TO RELATED APPLICATIONS

This application is a 371 National Stage of International Application No. PCT/KR2021/004450, filed Apr. 8, 2021, which claims priority to Korean Patent Application No. 10-2020-0043537, filed Apr. 9, 2020, Korean Patent Application No. 10-2020-0043594, filed Apr. 9, 2020, and Korean Patent Application No. 10-2021-0046121, filed Apr. 8, 2021, the disclosures of which are herein incorporated by reference in their entirety.

BACKGROUND

1. Field

The disclosure relates to a method and a device for storing and reporting random access information more efficiently in a next-generation mobile communication system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Recently, with the development of a next-generation mobile communication system, there is a need for a method and a device for storing and reporting random access information more efficiently.

SUMMARY

One aspect of the disclosure proposes a method for storing and reporting information related to a reception strength of a synchronization signal block (SSB) or a channel state information-reference signal (CSI-RS) more efficiently during a random access in a next-generation mobile communication system.

According to an embodiment of the disclosure to solve the above problems, a method of a terminal in a wireless communication system includes: storing first resource information related to a contention-based random access (CBRA) and second resource information related to a contention-free random access (CFRA); receiving, from a base station, a first message for requesting random access related information of the terminal; and transmitting, to the base station, a second message including the stored first resource information and the stored second resource information in response to the first message.

According to another embodiment of the disclosure, a method of a base station in a wireless communication system includes: transmitting, to a terminal, a first message for requesting random access related information of the terminal; and receiving, from the terminal, a second message including first resource information related to a contention-based random access (CBRA) and second resource information related to a contention-free random access (CFRA) in response to the first message.

According to yet another embodiment of the disclosure, a terminal in a wireless communication system includes: a transceiver; a memory; and a controller configured to: control the memory to store first resource information related to a contention-based random access (CBRA) and second resource information related to a contention-free random access (CFRA), control the transceiver to receive, from a base station, a first message for requesting random access related information of the terminal, and control the transceiver to transmit, to the base station, a second message including the stored first resource information and the stored second resource information in response to the first message.

According to yet another embodiment of the disclosure, a base station in a wireless communication system includes: a transceiver; and a controller configured to: control the transceiver to transmit, to a terminal, a first message for requesting random access related information of the terminal, and to control the transceiver to receive, from the terminal, a second message including first resource information related to a contention-based random access (CBRA) and second resource information related to a contention-free random access (CFRA) in response to the first message.

According to an embodiment of the disclosure, it is possible to store and report information about the reception strength of the SSB or the CSI-RS for the random access more efficiently.

BRIEF DESCRIPTION OF THE DRAWINGS

FIG. 10A is a diagram illustrating an ASN.1 structure of random access information stored by a UE in the disclosure.

DETAILED DESCRIPTION

Figure 1:
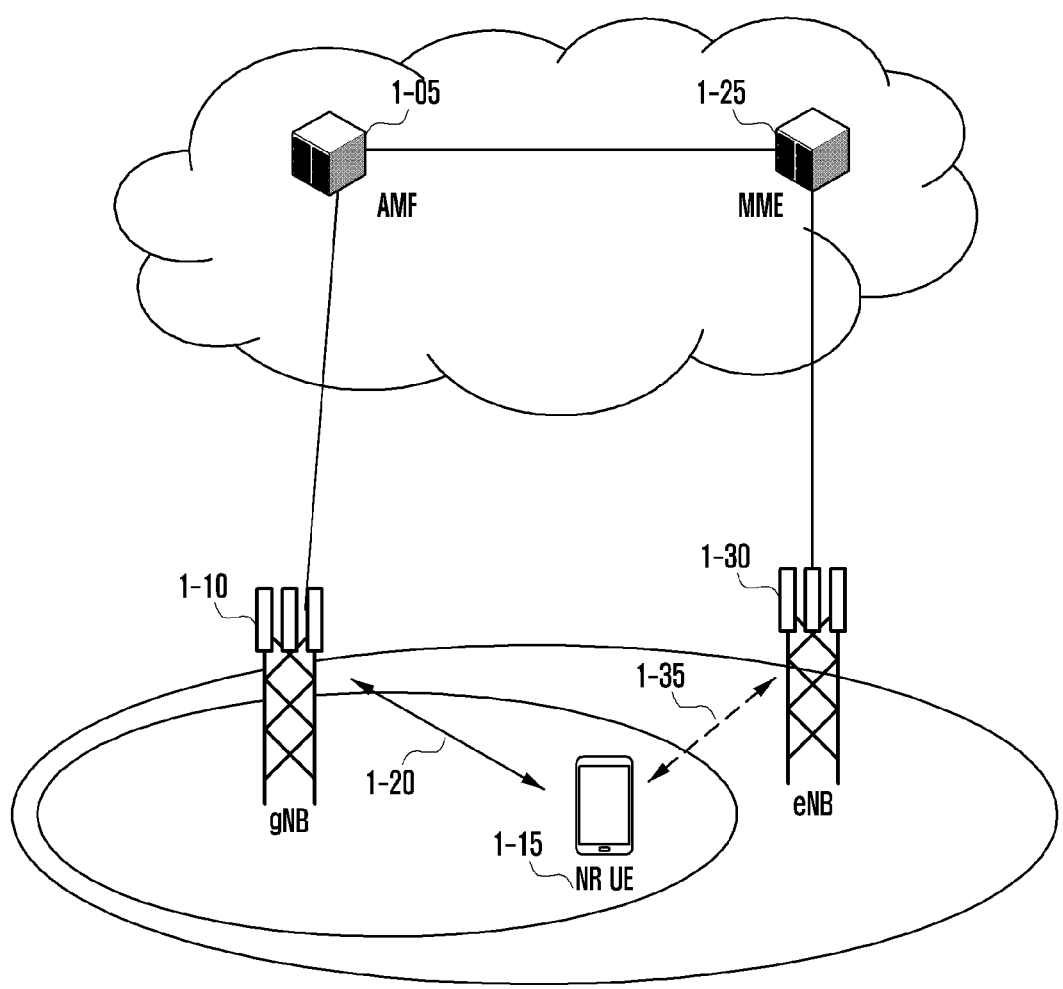
FIG. 1 is a diagram illustrating the structure of a next-generation mobile communication system.

In describing embodiments in the description, explanation of technical contents that are well known in the technical field to which the disclosure pertains and are not directly related to the disclosure will be omitted. This is to transfer the subject matter of the disclosure more clearly without obscuring the same through omission of unnecessary explanations.

For the same reason, in the accompanying drawings, some constituent elements are exaggerated, omitted, or briefly illustrated. Further, sizes of the respective constituent elements do not completely reflect the actual sizes thereof, and in the drawings, the same reference numerals are used for the same or corresponding constituent elements across various figures.

The aspects and features of the disclosure and methods for achieving the aspects and features will be apparent by referring to the embodiments to be described in detail with reference to the accompanying drawings. However, the disclosure is not limited to the embodiments disclosed hereinafter, and it can be implemented in diverse forms. The matters defined in the embodiments of the disclosure are only specific details provided to assist those of ordinary skill in the art in a comprehensive understanding of the disclosure, and the disclosure is only defined within the scope of the appended claims. In the entire description of the disclosure, the same reference numerals are used for the same elements across various figures.

In this case, it will be understood that each block of the flowchart illustrations, and combinations of blocks in the flowchart illustrations, can be performed by computer program instructions. These computer program instructions can be provided to a processor of a general purpose computer, special purpose computer, or other programmable data processing apparatus, such that the instructions, which are executed via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable data processing apparatus to produce a computer implemented process such that the instructions which are executed on the computer or other programmable data processing apparatus provide steps for implementing the functions specified in the flowchart block or blocks.

Also, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

In this case, the term "unit", as used in an embodiment, means, but is not limited to, a software or hardware component, such as FPGA or ASIC, which performs certain tasks. However, "unit" is not meant to be limited to software or hardware. The term "unit" may advantageously be configured to reside on the addressable storage medium and configured to execute on one or more processors. Thus, "unit" may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and "units" may be combined into fewer components and "units" or further separated into additional components and "units". Further, the components and "units" may be implemented to operate one or more CPUs in a device or a security multimedia card.

In describing the disclosure hereinafter, detailed explanation of related known functions or configurations will be omitted if it is determined that it obscures the gist of the disclosure unnecessarily. Hereinafter, embodiments of the disclosure will be described with reference to the accompanying drawings.

FIG. 1 is a diagram illustrating the structure of a next-generation mobile communication system.

Referring to FIG. 1, as illustrated, a radio access network of a next generation mobile communication system (new radio (NR)) is composed of a new radio node B (hereinafter, gNB) 1-10 and a new radio core network (AMF) 1-05. A new radio user equipment (hereinafter, NR UE or terminal) 1-15 accesses an external network through the gNB 1-10 and the AMF 1-05.

In FIG. 1, the gNB corresponds to an evolved node B (eNB) of the existing long term evolution (LTE) system. The gNB is connected to the NR UE on a radio channel, and thus it can provide a more superior service than the service of the existing node B (1-20). Because all user traffics are serviced on shared channels in the next generation mobile communication system, a device, which performs scheduling through consolidation of status information, such as a buffer state, an available transmission power state, and a channel state of each UE, is necessary, and the gNB 1-10 takes charge of this. One gNB generally controls a plurality of cells. In order to implement ultrahigh-speed data transmission as compared with the existing LTE, the gNB may have the existing maximum bandwidth or more, and a beamforming technology may be additionally grafted in consideration of the orthogonal frequency division multiplexing (hereinafter, referred to as "OFDM") as a radio access technology. Further, an adaptive modulation & coding (hereinafter, referred to as "AMC") scheme determining a modulation scheme and a channel coding rate is applied to match the channel state of the UE. The AMF 1-05 performs functions of mobility support, bearer configuration, and QoS configuration. The AMF is a device taking charge of not only UE mobility management but also various kinds of control functions, and is connected to a plurality of base stations. Further, the next generation mobile communication system may interlock with the existing LTE system, and the AMF is connected to an MME 1-25 through a network interface. The MME is connected to an eNB 1-30 that is the existing base station. The UE supporting an LTE-NR dual connectivity may transmit and receive data to and from not only the gNB but also the eNB while maintaining connections thereto (1-35).

Figure 2:
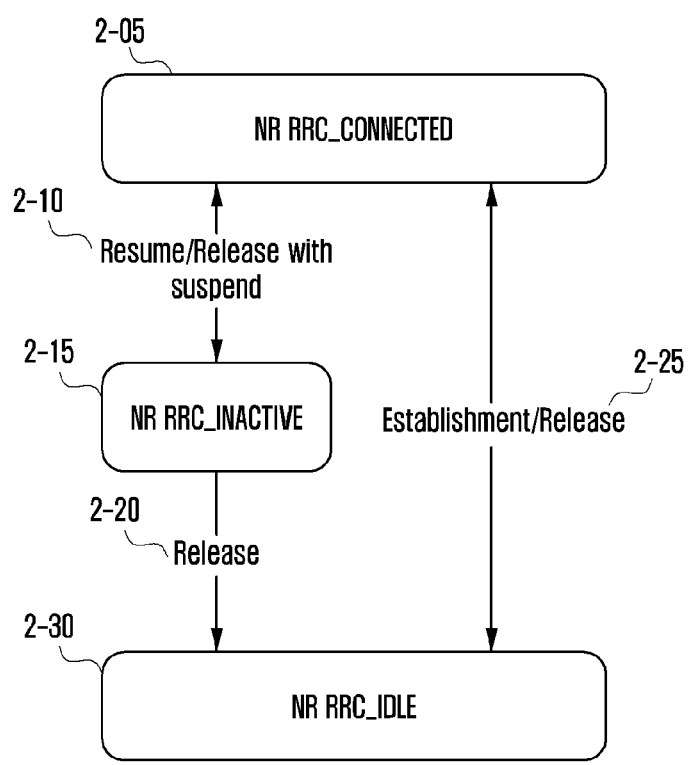
FIG. 2 is a diagram illustrating a radio access state transition in a next-generation mobile communication system.

FIG. 2 is a diagram illustrating a radio access state transition in a next-generation mobile communication system.

The next-generation mobile communication system has three kinds of radio resource control (RRC) states. A connected mode (RRC_CONNECTED) 2-05 corresponds to a radio access state where a UE can perform data transmission/reception. An idle mode (RRC_IDLE) 2-30 corresponds to a radio access state where the UE monitors whether paging is transmitted to itself. The above two modes correspond to the radio access states being applied even to the existing LTE system, and the detailed technology thereof is the same as that of the existing LTE system. In the next-generation mobile communication system, an inactive (RRC_INACTIVE) radio access state 2-15 has been newly defined. In the radio access state, UE context is maintained in the base station and the UE, and RAN-based paging is supported. The features of the new radio access state are arranged as follows.

Cell re-selection mobility;
CN-NR RAN connection (both C/U-planes) has been established for UE;
The UE AS context is stored in at least one gNB and the UE;
Paging is initiated by NR RAN;
RAN-based notification area is managed by NR RAN;
NR RAN knows the RAN-based notification area which the UE belongs to;

The new INACTIVE radio access state may be transitioned to a connected mode or the idle mode by using a specific procedure. In accordance with a resume process, the mode is switched from the INACTIVE mode to the connected mode, and the mode is switched from the connected mode to the INACTIVE mode by using a release procedure including suspend configuration information (2-10). In the above procedure, one or more RRC messages are transmitted and received between the UE and the base station, and the procedure is composed of one or more operations. Further, the mode can be switched from the INACTIVE mode to the idle mode through a release procedure after the resume process (2-20). The switching between the connected mode and the idle mode follows the existing LTE technology. That is, the mode switching is performed through an establishment or release procedure (2-25).

Figure 3:
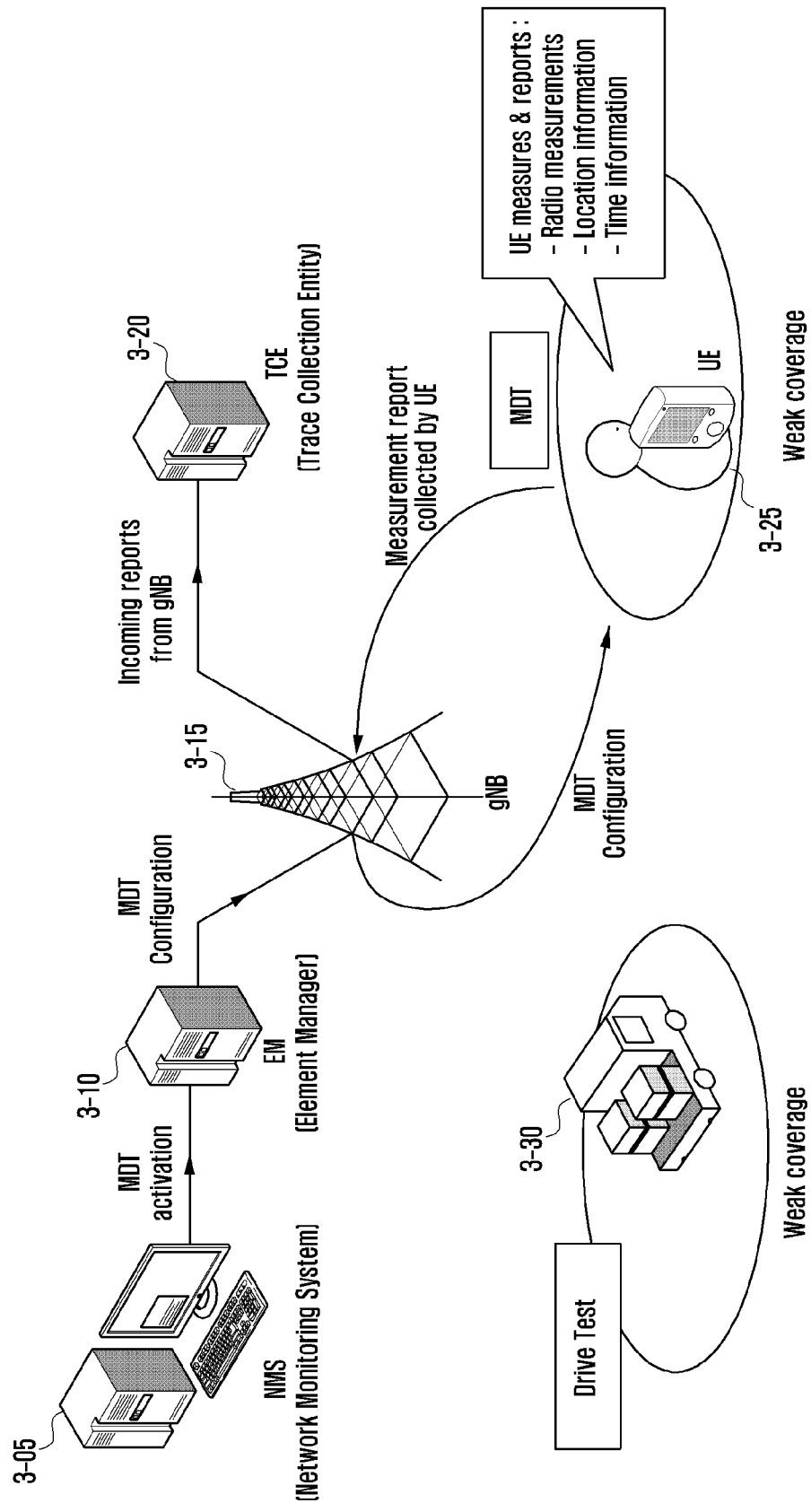
FIG. 3 is a diagram illustrating a technology to collect and report cell measurement information in the disclosure.

FIG. 3 is a diagram illustrating a technology to collect and report cell measurement information in the disclosure.

During network establishment or optimization, a mobile communication service provider typically goes through processes of measuring signal strength in an expected service area, and based on this, disposing or readjusting base stations in the service area. The service provider loads signal measurement equipment in a vehicle, and collects cell measurement information in the service area, so that a lot of time and money is required. In general, the above process is performed by utilizing the vehicle, and is commonly called drive test (3-30). The UE is mounted with a function capable of measuring a signal to the base station in order to support operations of cell reselection or handover (HO), or serving cell addition during movement between cells. Accordingly, instead of the drive test, the UE 3-25 in the service area may be utilized, and this is called minimization of drive test (MDT). The service provider may configure an MDT operation with respect to specific UEs through several configuration devices 3-05, 3-10, and 3-15, and the UEs collect and store signal strength information from a serving cell and peripheral cells in the connected mode (RRC_Connected), the idle mode (RRC_Idle), or the inactive mode (RRC_Inactive). In addition, the UEs also store various pieces of information, such as location information, time information, and signal quality information. The information stored as above may be reported to a network 3-15 when the UEs are in the connected mode, and the information is transferred to a specific server 3-20.

The MDT operation may be briefly classified into an immediate MDT and a logged MDT.

The immediate MDT is featured to immediately report the collected information to the network. Since the report should be immediately performed, only a connected mode UE can perform this. Typically, an RRM measurement process for supporting the operations of handover and serving cell addition may be reused, and location information and time information may be additionally reported.

The logged MDT is featured to store the collected information without immediate report to the network, and to report the stored information after the UE is switched to the connected mode thereafter. The UE in the idle mode, which is unable to report immediately to the network, may perform this. The UE in the inactive mode, which is introduced in the next-generation mobile communication system, may perform the logged MDT. When a specific UE is in the connected mode, the network may provide configuration information for performing the logged MDT operation to the UE, and the UE may collect and store the configured information after being switched to the idle mode or the inactive mode.

The RRC state of the UE that performs the Immediate MDT and Logged MDT operations may be represented in the following Table 1.

TABLE 1

| | RRC state |
|---|---|
| Immediate MDT | RRC_Connected |
| Logged MDT | RRC_Idle, RRC_Inactive |

Figure 4:
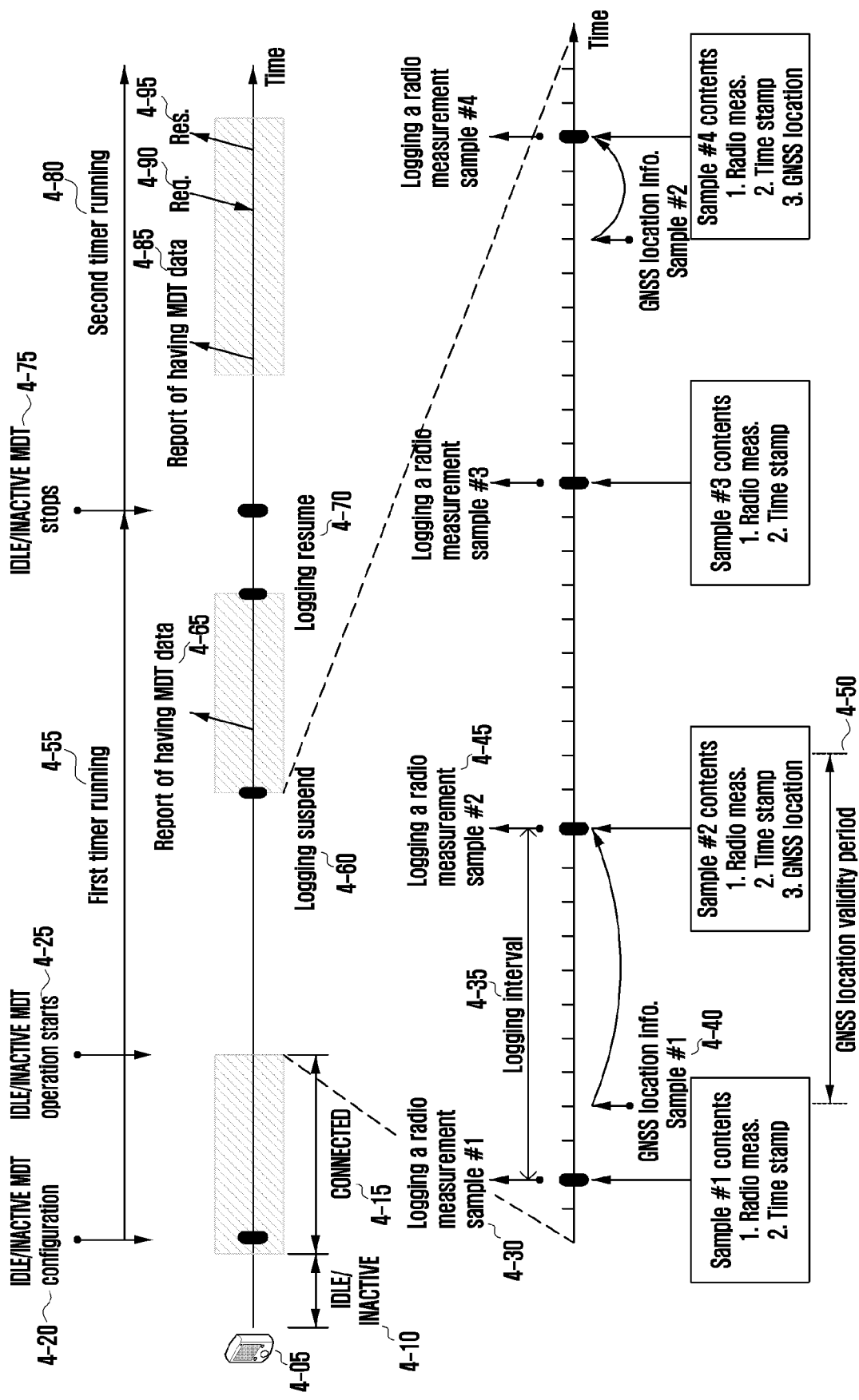
FIG. 4 is a diagram illustrating a method for collecting and reporting cell measurement information in the disclosure.

FIG. 4 is a diagram illustrating a method for collecting and reporting cell measurement information in the disclosure.

A UE 4-05 may be switched from the idle mode or the inactive mode 4-10 to the connected mode 4-15. In the connected mode, the UE may collect MDT data through an immediate MDT operation, and may report the collected MDT data to a base station. The UE having been switched to the connected mode may be provided with logged MDT configuration information that is performed in the idle mode or the inactive mode from the base station (4-20). The configuration information may be included in a specific RRC message to be transmitted to the UE, and the UE having received the message may drive a first timer (4-55). The UE may perform the logged MDT operation in the idle mode or the inactive mode section until the first timer expires. The value of the first timer may be included in the logged MDT configuration information. If the UE is switched to the idle mode or the inactive mode, the UE may perform the logged MDT in accordance with the received configuration information (4-25). The UE may store specific information collected every logging interval 4-35 (4-30 and 4-45). Further, if effective location information 4-40 is collected, the UE may also store the same information. It may be determined that the location information is effective if a specific time 4-50 does not elapse after the information is collected. The specific time may be shorter than or equal to the logged interval. Even if the first timer has not yet expired, the UE may suspend the logged MDT operation having been performed when the UE is switched to the connected mode (4-60). However, the first timer may be continuously driven without being suspended even in the connected mode section. That is, the first timer may be continuously driven regardless of the change of the RRC state. However, in case that the MDT data is unable to be stored any more due to the insufficient UE memory for storing the MDT data, or the logged MDT configuration information is released, the first timer may be stopped. A case that the logged MDT configuration information is released may be a case that another logged MDT configuration information is provided from a serving RAT or another RAT, or a case that the UE is detached or power is cut off. In the RRC connection establishment or RRC connection resume process, the UE may report, to the base station, that the UE has the collected information (MDT data) that is stored by the UE itself by using an RRC setup complete message or an RRC resume complete message (4-65).

The connection establishment process may be a process in which the UE is switched from the idle mode to the connected mode. Typically, this process may be composed of three operations, and three kinds of RRC messages may be used.

Step 1: The UE transmits an RRC setup request message to the base station.

Step 2: The base station transmits an RRC setup message to the UE.

Step 3: The UE transmits an RRC setup complete message to the base station.

The connection resume process may be a process in which the UE is switched from the inactive mode to the connected mode. Typically, this process may be composed of three operations, and three kinds of RRC messages may be used.

Step 1: The UE transmits an RRC resume request message to the base station.

Step 2: The base station transmits an RRC resume message to the UE.

Step 3: The UE transmits an RRC resume complete message to the base station.

The UE may report information indicating that the UE has the collected information to a target base station even in an RRC connection reestablishment and handover process in addition to the connection establishment or connection resume process. In case that the logged MDT has been established, but there is no information collected and stored, the report may be omitted. If necessary, the base station having received the report may request the UE to report the MDT data stored in the UE. The UE may continuously store the MDT data having not been reported for a specific time. In case that the UE is switched again to the idle mode or the inactive mode, and the first timer has not yet expired, the logged MDT operation may be resumed (4-70). If the first timer has expired, the logged MDT operation may be stopped (4-75). The UE having stopped the above operation may drive a second timer (4-80), and may maintain the stored MDT data until the timer expires. After the timer has expired, whether to delete the stored MDT data may be determined by UE implementation. The value of the second time may be included in the logged MDT configuration information, or may not be configured, but a predefined value may be applied. If the UE is switched again to the connected mode, the UE may report that the UE has the collected information (MDT data) stored by itself to the base station (4-85). In this case, the base station may request the UE to report the MDT data stored by the UE by using a specific RRC message (4-90). In response to this, the UE may include the stored MDT data in the specific RRC message, and may report the message to the base station (4-95).

Figure 5:
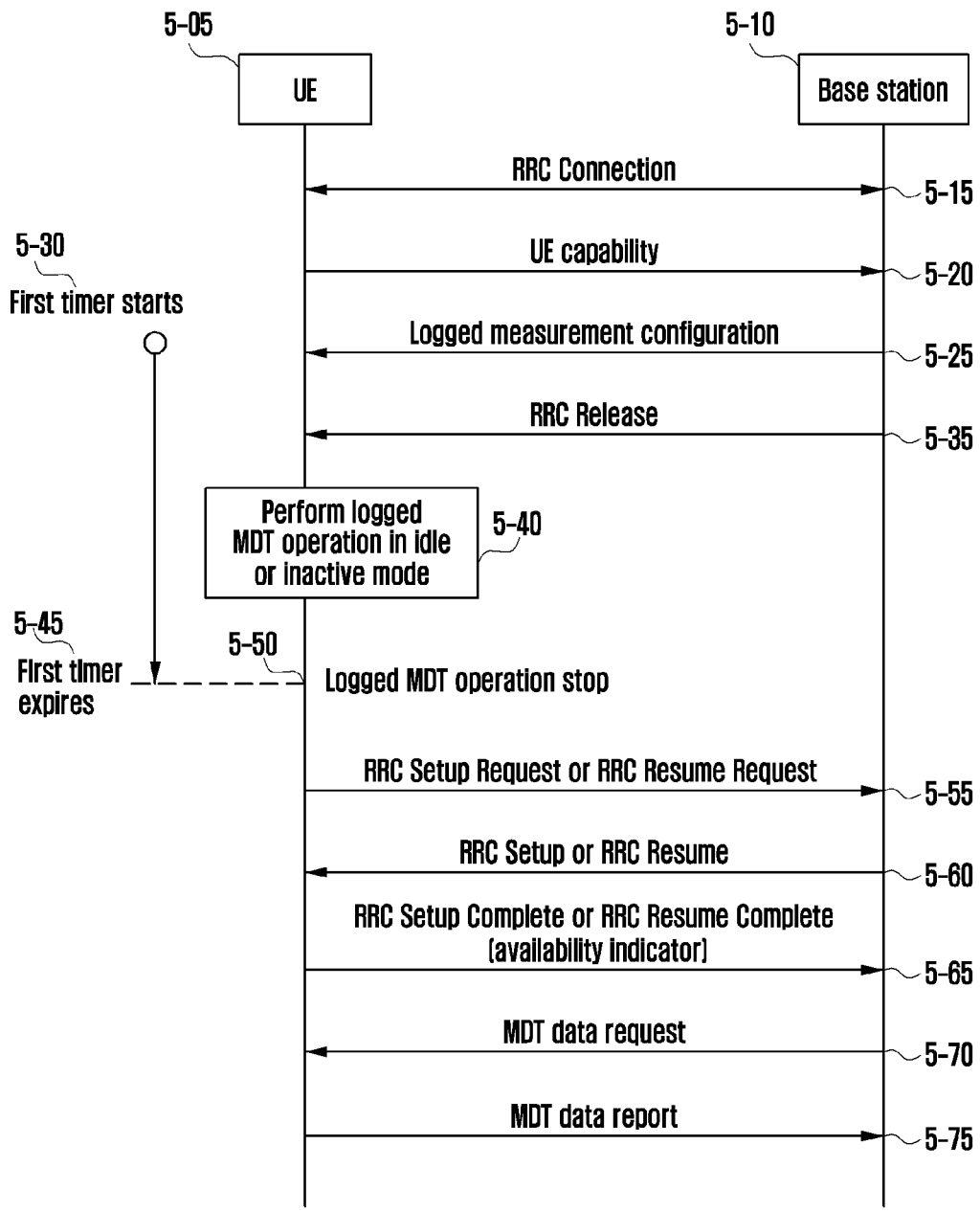
FIG. 5 is a sequential diagram illustrating an operation of collecting and reporting cell measurement information in the disclosure.

FIG. 5 is a sequential diagram illustrating an operation of collecting and reporting cell measurement information in the disclosure.

A UE 5-05 may establish connection with a base station 5-10 (5-15). The UE may provide UE capability information to the base station (5-20), and may indicate whether the base station supports the MDT operation and what frequency the base station can measure. The base station may include configuration information necessary to perform the logged MDT operation in a specific RRC message, and may transmit the RRC message to the UE (5-25). As an example, the configuration information may include at least one of the following information.

Trace reference information

Trace recording session reference information

Trace collection entity (TCE) ID information: The base station transmits the MDT data information reported from the UE to a data server designated by the ECE ID.

Absolute time information: Absolute time in the current cell that provides the logged MDT configuration information Area configuration: This is area information capable of collecting and storing measurement information through the logged MDT operation, and is indicated in the unit of a cell. Further, this may include RAT information for collecting the measurement information. A list included in the RAT information may be a black list or a white list. In case of the black list, cell measurement information is collected for the RAT that is not included in the list. In case of the white list, the cell measurement information is not collected for the RAT that is not included in the list.

Logging duration: This is a value of the first timer, and when the timer is being driven, the logged MDT operation is performed in the idle mode or the inactive mode.

Logging interval: This is an interval for storing the collected information.

MDT PLMN list (i.e., plmn-IdentityList): This is PLMN list information, and includes PLMN information for not only performing the logged MDT operation but also reporting whether to store the MDT data and the MDT data.

Indicator indicating whether to perform the logged MDT operation in the idle mode, in the inactive mode, or in both modes. The indicator may indicate the RRC state for performing the logged MDT operation, or may be defined that the logged MDT operation is performed always in the idle mode and the inactive mode without the indicator. The UE performs the logged MDT operation only in the RRC state indicated by the indicator.

Indicator indicating whether to collect and store beam level measurement information. In the next-generation mobile communication system, a beam antenna may be applied. With respect to the frequency for performing a beam-based operation without the indicator, it may be defined that beam level measurement is always collected and stored.

Information on the maximum number of beams being collected and stored, and information on the minimum signal strength of the beam being stored. The UE may omit the storage of information of the beam that is weaker than the minimum signal strength. If all beams are weaker than the configured minimum signal value, one of beam information having the strongest signal strength among them may be stored, or an indicator indicating that all beams are weaker than the configured minimum signal value may be included.

Indicator indicating whether to be able to trigger an MDT retrieval operation in 2nd step RRC resume process.

The UE having received the logged MDT configuration information may drive a first timer (5-30). The value of the first timer may be configured to be the same as the value of the logging duration. The base station may switch the UE to the idle mode or the inactive mode by using the RRC release message (5-35). Depending on what RRC state the UE is switched to, the RRC release message may include configuration information for an operation in the RRC state. If the first timer is being driven, the UE may perform the logged MDT in the idle mode or the inactive mode (5-40). The UE measures the signal strength of the serving cell and neighboring cells, and obtains location information. If the beam level measurement is configured, it is possible to collect and store a signal strength value for the beam that is larger than the configured minimum value in the serving cell and the neighboring cells. The maximum number of beams that can be stored may be configured, or may be predefined. The signal strength may mean the RSRP or RSRQ or SINR. The collected information may be stored at the logged interval period. Each log information that is stored in every period may include an indicator indicating whether the stored information is collected in the idle mode or the inactive mode. Further, for each initial log when the mode is switched, the indicator may be included. This may minimize a signaling overhead due to the indicator. If the first timer expires (5-45), the logged MDT operation may be stopped (5-50).

In case that the UE is in the idle mode or the inactive mode by the RRC release message, and receives RAN or CN paging from the base station, or mobile originated (MO) data transmission is activated, the UE may initialize an establishment process or a resume process for switchover from the idle mode or the inactive mode to the connected mode.

The establishment process or the resume process may be composed of the following operations.

Step 1: The UE transmits an RRC setup request message or an RRC resume request message to the base station (5-55).

Step 2: The base station transmits an RRC setup message or an RRC resume message to the UE (5-60).

Step 3: The UE transmits an RRC setup complete message or an RRC resume complete message to the base station (5-65).

The UE may include an indicator indicating whether MDT data stored by the UE itself exists in the RRC setup complete message or the RRC resume complete message. If necessary, the base station having received the RRC setup complete message may request the MDT data report by using a specific RRC message (5-70). The UE having received the request may report the MDT data by using the specific RRC message (5-75).

Figure 6:
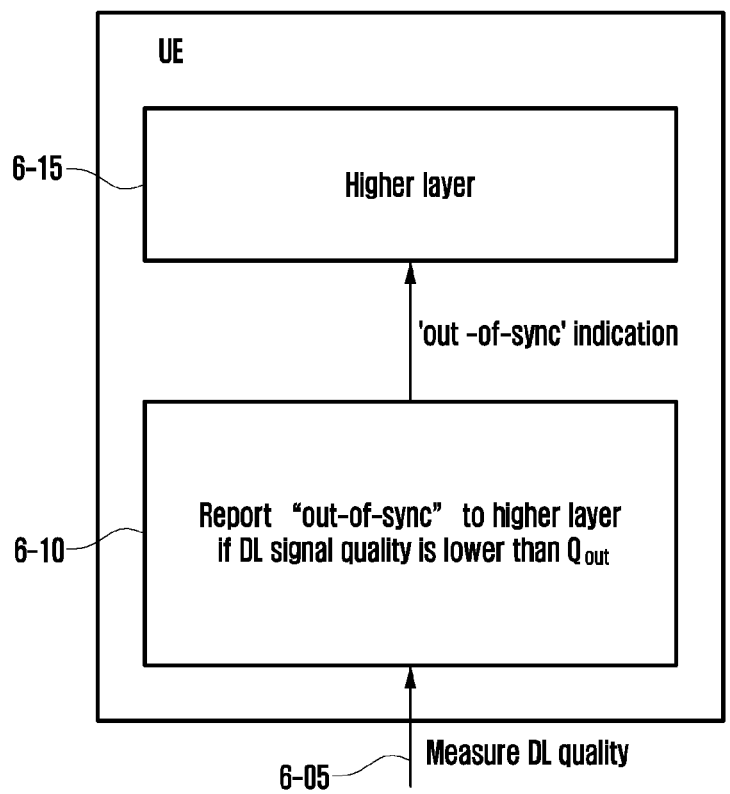
FIG. 6 is a diagram illustrating a radio link monitoring (RLM) operation in the disclosure.

FIG. 6 is a diagram illustrating a radio link monitoring (RLM) operation in the disclosure.

A UE physical layer may measure a downlink signal quality from a CRS of a serving cell (6-05). The physical layer may determine whether the signal quality is lower than a specific threshold value Qout (6-10). The threshold value may be a signal quality value corresponding to a specific BLER that is measured on a PDCCH. If the signal quality is lower than the specific threshold value Qout, the physical layer may transfer an "out-of-sync" indicator to a higher layer. In LTE technology, the above operation is called RLM. If the indicator is transferred to the higher layer more than a specific number of times, the higher layer may drive a specific timer, and may declare the RLF when the timer expires (6-15).

Figure 7:
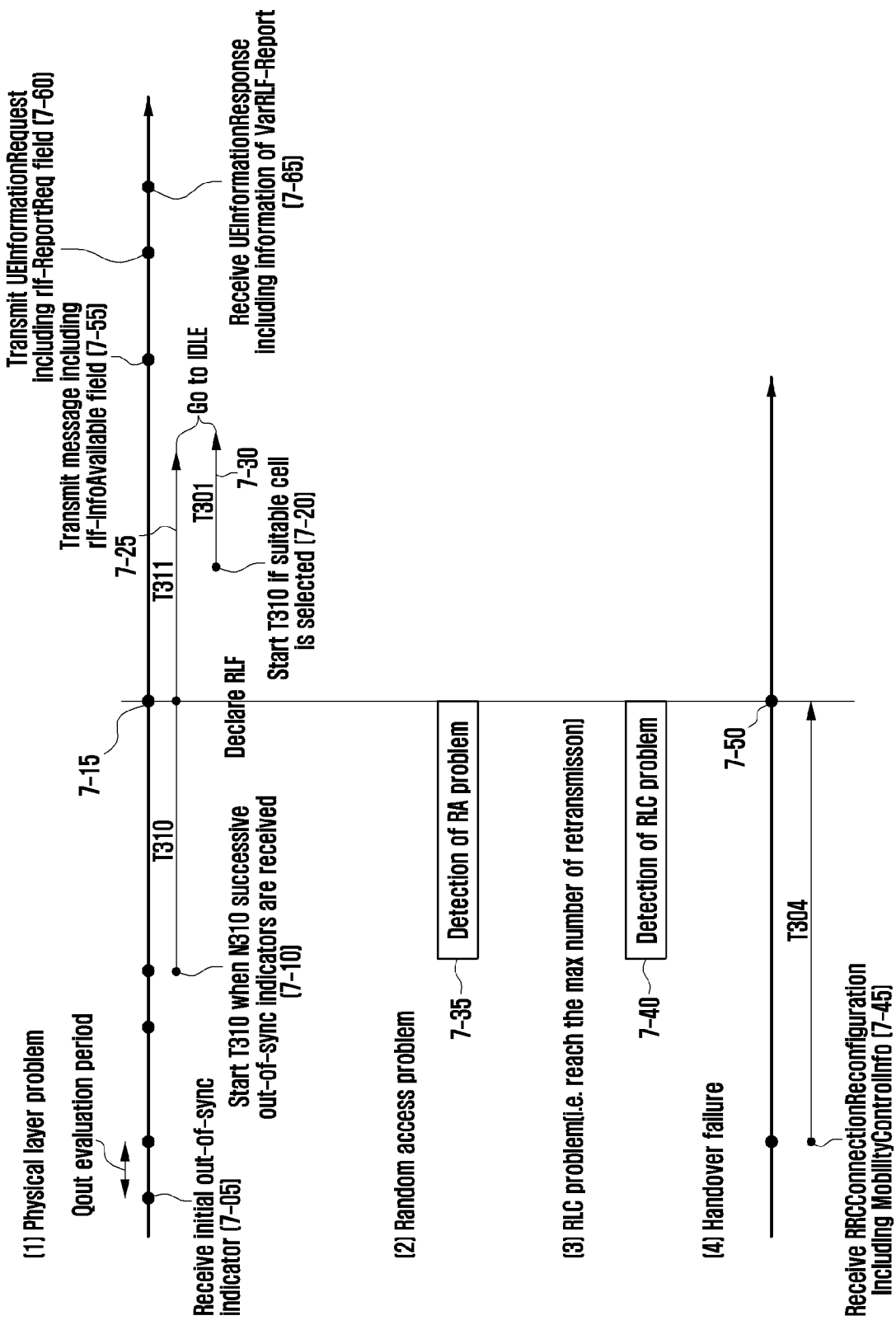
FIG. 7 is a diagram illustrating a radio link failure (RLF) operation and an RLF report in the disclosure.

FIG. 7 is a diagram illustrating a radio link failure (RLF) operation and an RLF report in the disclosure.

As described above, the RLF may be declared in accordance with the result from the RLM. The UE physical layer may determine whether the downlink signal quality from the CRS of the serving cell is lower than the specific threshold value Qout every specific period, that is, Qout evaluation period. If the signal quality is lower than the specific threshold value Qout, the physical layer may transfer the "out-of-sync" indicator to the higher layer. If the indicator is transferred to the higher layer as many as a specific number of times of N310 after the initial indicator is transferred to the higher layer (7-05), the specific timer T310 is driven (7-10). The physical layer may also determine whether the downlink signal quality from the CRS of the serving cell is higher than a specific threshold value Qin. If the signal quality is higher than the specific threshold value Qin, the physical layer may transfer an "in-sync" indicator to the higher layer. If the indicator is transferred to the higher layer as many as a specific number of times, the timer T310 being driven may be stopped. If the timer T310 is not stopped, but expires, the higher layer may declare the RLF (7-15). After the RLF declaration, the UE may drive another timer T311. The UE may search for a new suitable cell, and if the new suitable cell is not searched for until the T311 expires, the UE may be switched to the idle mode (7-25). If the new suitable cell is searched form before the timer expires, the UE drives the timer T301, and may perform a reestablishment process to the cell (7-20). If the reestablishment is not successfully completed before the timer T301 expires, the UE may be switched to the idle mode (7-30). If the reestablishment has succeeded, the UE may maintain the connected mode to the cell. The RLF may be declared by the RLM operation, and may be declared in accordance with another condition. Even in case that the random access (RA) has failed, the RLF may be declared (7-35). Further, if a packet is not successfully transferred even in case of reaching the maximum number of times of retransmissions in the RLC layer, the RLF may be declared (7-40). Explanation of the operations of the T301 and T311 may be as in Table 2 below.

TABLE 2

| Timer | Start | Stop | At expiry |
|---|---|---|---|
| T301 | Upon transmission of RRCReestabilshment Request | Upon reception of RRCReestablishment or RRCSetupmessage as well as when the selected cell becomes unsuitable | Go to RRC_IDLE |
| T311 | Upon initiating the RRC connection re-establishment procedure | Upon selection of a suitable NR cell or a cell using another RAT. | Enter RRC_IDLE |

Another case where the RLF is declared may be a case where the handover has failed. If an RRCConnectionReconfiguration message including handover configuration information and mobilityControlInfo IE is received (7-45), the timer T304 may be driven. The value of the timer T304 may be provided from the mobilityControlInfo. If the random access to the target cell has not been successfully completed before the timer expires, it may be considered as the handover failure, and the RLF may be declared (7-50).

Specific information collected when the RLF occurs in the UE is useful for optimization of a cell area. Accordingly, such information is stored by the UE when the RLF occurs, and thereafter, if the UE is successfully switched to the connected mode, the information may be reported to the base station. The report is called an RLF report, and the specific information reported in this case may be as follows. In this case, information related to the random access process may be stored together.

plmn-IdentityList
measResultLastServCell
measResultNeighCells
locationInfo
failedPCellId
previousPCellId
timeConnFailure
C-RNTI used in the source PCell
connectionFailureType
absoluteFrequencyPointA: absolute frequency position of the reference resource block (Common RB 0)
locationAndBandwidth: Frequency domain location and bandwidth of the bandwidth part associated to the random-access resources used by the UE
subcarrierSpacing: Subcarrier spacing used in the BWP associated to the random-access resources used by the UE
msg1-Frequency Start: Offset of lowest PRACH transmission occasion in frequency domain with respective to PRB (physical resource block) 0 of the UL BWP
msg1-SubcarrierSpacing: Subcarrier spacing of PRACH resources
msg1-FDM: The number of PRACH transmission occasions FDM-modulated in one time instance
raPurpose: the RA scenario for which the RA report entry is triggered
perRAInfoList: detailed information about each of the random access attempts in the chronological order of the random access attempts, for example, SSB index related to preamble transmission, the number of preamble transmissions per SSB, and whether to generate contention.

When the UE is switched to the connected mode through the RRC establishment process or the RRC resume process, the UE may report, to the base station, that the UE stores the RLF report by using a specific RRC message, such as an RRCSetupComplete message or an RRCResumeComplete message (7-55). The base station may instruct the UE to report the RLF report by using the UEInformationRequest message (7-60). The UE may report the UEInformationResponse message including the RLF report to the base station (7-65).

Figure 8:
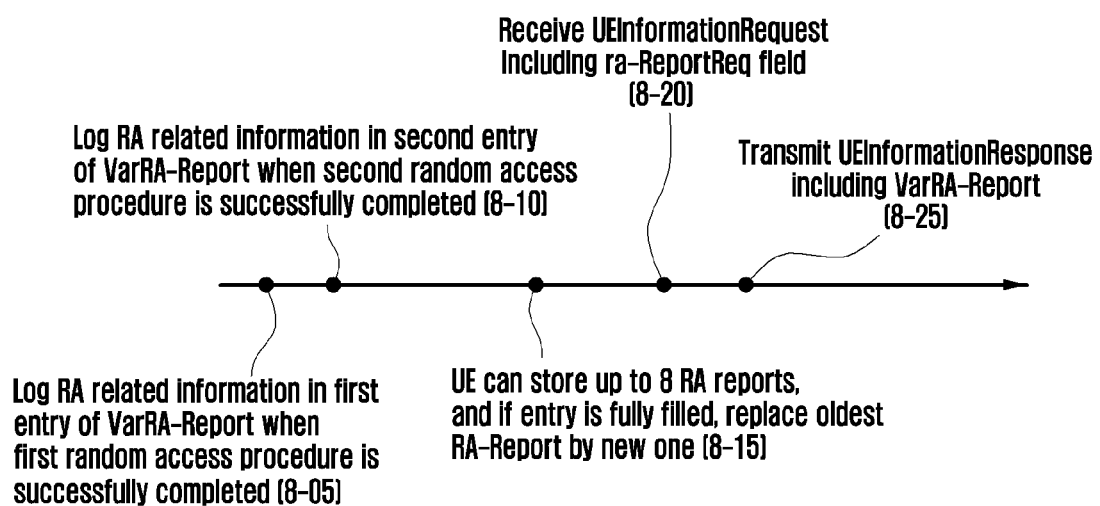
FIG. 8 is a diagram illustrating a random access (RA) report in the disclosure.

FIG. 8 is a diagram illustrating a random access (RA) report in the disclosure.

The UE may store information related to the random access that is successfully completed in VarRA-Report that is a UE internal variable (8-05). This is called one RA report. The information may be as follows.

CellId: CGI of the cell in which the associated random access procedure was performed absoluteFrequencyPointA: absolute frequency position of the reference resource block (Common RB 0)

locationAndBandwidth: Frequency domain location and bandwidth of the bandwidth part associated to the random-access resources used by the UE subcarrierSpacing: Subcarrier spacing used in the BWP associated to the random-access resources used by the UE msg1-Frequency Start: Offset of lowest PRACH transmission occasion in frequency domain with respective to PRB0 of the UL BWP msg1-SubcarrierSpacing: Subcarrier spacing of PRACH resources msg1-FDM: The number of PRACH transmission occasions FDM-modulated in one time instance raPurpose: the RA scenario for which the RA report entry is triggered perRAInfoList: detailed information about each of the random access attempts in the chronological order of the random access attempts Further, when storing the information, if there is EPLMN information being stored, the UE may store the EPLMN list, and otherwise, the UE may store the selected PLMN information together.

If another random access process has succeeded after the RA information is stored, information related to the random access may be stored (8-10). In this case, if the RPLMN is included in the stored PLMN information, the PLMN information may be updated and stored as the EPLMN information being currently stored. If the RPLMN is not included in the stored PLMN information, information stored in the VarRA-Report may be deleted in all.

The UE may store up to 8 RA reports. If a new random access process is successfully completed in a state where 8 RA reports have already been stored, the first stored RA report may be deleted, and information related to the random access process may be stored (8-15).

After the UE is switched to the connected mode, the base station may request the stored RA report information by using a specific RRC message (8-20). In this case, if the UE stores the RA report, and the RPLMN is included in the stored PLMN information, the UE may report the stored RA report to the base station by using the specific RRC message (8-25). The reported RA report information may be deleted from the VarRA-Report in all.

Figure 9:
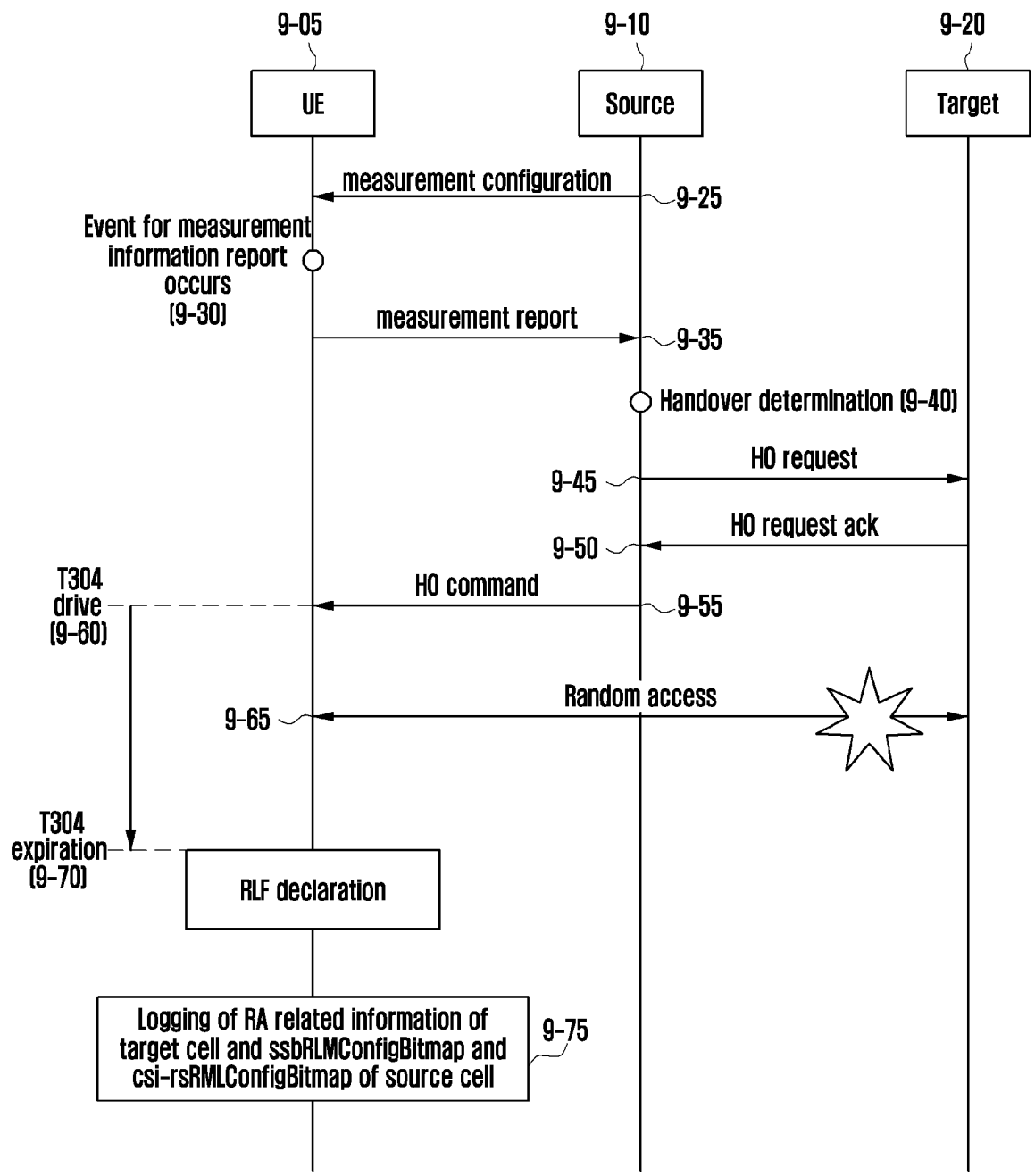
FIG. 9 is a sequential diagram illustrating a process in which an RLF occurs due to a handover failure in the disclosure.

FIG. 9 is a sequential diagram illustrating a process in which an RLF occurs due to a handover failure in the disclosure.

A UE 9-05 may receive a specific RRC message including measurement configuration information from a source cell 9-10 (9-25). The UE may measure the signal quality of a serving cell and neighboring cells by applying the measurement configuration information, and may report the collected cell measurement information to the source cell (9-35) when a periodic or configured event occurs (9-30). The source cell may determine whether to trigger a handover operation based on the reported cell measurement information (9-40). For example, in case that event A3 (neighbor becomes offset better than SpCell) is satisfied, and the cell measurement information is reported, the source cell may determine the handover. If it is determined to trigger the handover, the source cell may request the handover from one target cell 9-20 through a specific inter-node message (9-45). The target cell having received the request may accept this, and may transmit the handover configuration information necessary for the handover operation to the source cell (9-50). The source cell may include the handover configuration information and additional configuration information received from the target cell in the specific RRC message, and may transmit the RRC message to the UE (9-55). The configuration information may include at least one of a target cell ID, frequency information, configuration information (dedicated preamble information and dedicated radio resource information) necessary for a random access operation to the target cell, transmission power information, and C-RNTI information used in the target cell.

The UE having received the handover configuration information may immediately perform a random access process to the target cell, and may drive the timer T304 (9-60). The UE may transmit the provided preamble (9-65). If the dedicated preamble is unable to be provided, the UE may transmit one of the preambles being used based on contention. The target cell having received the preamble may transmit a random access response (RAR) to the UE (9-70). The UE may transmit msg3 to the target cell by using UL grant information included in the RAR (9-75). In case of an LTE system, the msg3 may include an RRCConnectionReconfigurationComplete message, and in case of an NR system, the msg3 may include an RRCReconfigurationComplete message. If the random access process is successfully completed, the UE may consider that the handover has successfully been completed, and may stop the timer T304 being driven. If the handover is not successfully completed until the timer T304 expires, the UE may consider this as the handover failure, and may declare the RLF (9-70).

The UE may store valid information for the RLF report in accordance with the expiry of the T304 (9-75). The UE may store information related to the random access having been attempted to an uplink of the target cell most recently. For example, the UE may store frequency information of a reference resource block related to an RA resource in the uplink of the target cell and absoluteFrequencyPointA, and may store locationAndBandwidth and subcarrierSpacing related to the RA resource at the most recent active uplink BWP of the target cell, and may store at least one of msg1-FrequencyStart, msg1-SubcarrierSpacing, and msg1-FDM at the most recent active uplink BWP of the target cell. Further, the UE may store at least one of ssbRLMConfigBitmap and csi-rsRLMConfigBitmap related to the most recent active BWP of the source cell.

If the RLF occurs due to a radio link failure other than the handover failure (T304 expiry), the UE may store valid information for the RLF report. The UE may store information related to the random access most recently attempted to the uplink of the source cell. For example, the UE may store frequency information of a reference resource block related to an RA resource in the uplink of the source cell and absoluteFrequencyPointA, and may store locationAndBandwidth and subcarrierSpacing related to the RA resource at the most recent active uplink BWP of the source cell, and may store at least one of msg1-FrequencyStart, msg1-SubcarrierSpacing, and msg1-FDM at the most recent active uplink BWP of the source cell. Further, the UE may store ssbRLMConfigBitmap and csi-rsRLMConfigBitmap related to the most recent active BWP of the source cell.

Figure 10B:
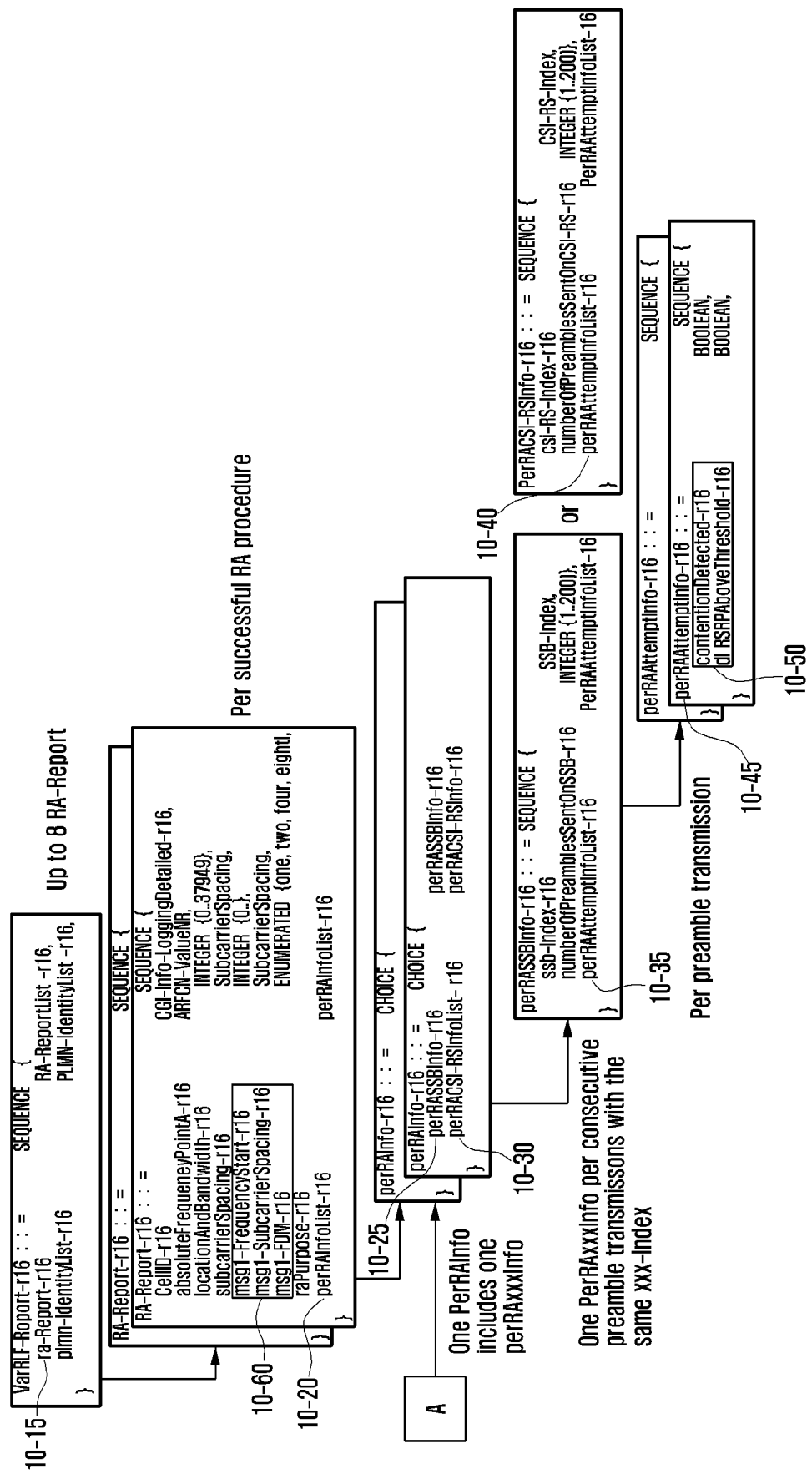
FIG. 10B is a diagram illustrating an ASN.1 structure of random access information stored by a UE in the disclosure.

FIGS. 10A and 10B are diagrams illustrating an ASN.1 structure of random access information stored by a UE in the disclosure.

In order to include the random access information during RLF, VarRLF-Report that is an internal variable of the UE may include rlf-Report (10-05), and the rlf-Report may include perRAInfoList (10-10). Further, in order to store information of the successfully completed random access, the UE may store the information related to the random access in the VarRA-Report that is the internal variable of the UE. The VarRA-Report may include ra-ReportList (10-15), and the ra-ReportList may be a list including a plurality of (maximally 8) RA-Report type ra-Reports. Each ra-Report may be generated for one random access procedure (RA procedure), and the ra-Report may include perRAInfo-List in the same manner as the rlf-Report (10-20). The perRAInfoList included in the ra-Report and the rlf-Report may be a list including a plurality of PerRAInfo type perRAInfos. The UE may perform one or more random access attempts (RA attempts) in one random access procedure, and each random access attempt may be performed by transmitting once preamble. The preamble may be transmitted based on the SSB or CSI-RS. In the former, the per-RAInfo may be selected as the perRASSBInfo (10-25), and in the latter, it may be selected as the perRACSI-RSInfo (10-30). One perRASSBInfo (or perRACSI-RSInfo) may include more than once SSB (or CSI-RS) based random access attempts, and information about each random access attempt may be stored one by one in a list so called perRAAttemptInfoList in the form of PerRAAttemptInfo 10-35 and 10-40. The PerRAAttemptInfo may store the preamble transmission result for the one random access attempt (10-45), and contentionDetected may be a 1-bit indicator indicating whether the random access result contention has been detected, and dlRSRPAboveThreshold may be a 1-bit indicator indicating whether the reception strength of the random accessed SSB or CSI-RS exceeds a specific threshold (10-50). The detailed explanation of the dlRSR-PAboveThreshold may be as follows.

dlRSRPAboveThreshold: This field is used to indicate whether the DL beam (SSB or CSI-RS) quality associated to the random access attempt was above or below the threshold (rsrp-ThresholdSSB when NUL is used and rsrp-ThresholdSSB-SUL when SUL is used)

The rlf-Report or the ra-report includes msg1-FrequencyStart, msg1-SubcarrierSpacing, and msg1-FDM (10-55, 10-60) notifying of the resource information used for the random access. The msg1-FrequencyStart represents an offset value of the lowest physical random access channel (PRACH) occasion on the frequency from PRB0 of the UL BWP, and msg1-SubcarrierSpacing represents sub-carrier spacing used in PRACH resources, and msg1-FDM represents the number of frequency division multiplexed (FDMed) PRACH transmission occasions.

First Embodiment

The UE may obtain the rsrp-ThresholdSSB through rach-ConfigCommon or beacmFailureRecoveryConfig related to UL BWP configuration, and in case of performing the random access, the UE may select the SSB to perform the random access by comparing the rsrp-ThresholdSSB and the RSRP of the SSB with each other. In case of performing the CSI-RS based random access, the UE may select the CSI-RS to perform the random access by comparing rsrp-Thresh-oldCSI-RS that is provided through rach-ConfigDedicated with the RSRP of the CSI-RS. The rsrp-ThresholdSSB-SUL may be a threshold value that is used to determine whether to use a normal uplink (NUL) carrier or a supplementary uplink (SUL) carrier when the UE performs the random access.

Figure 11:
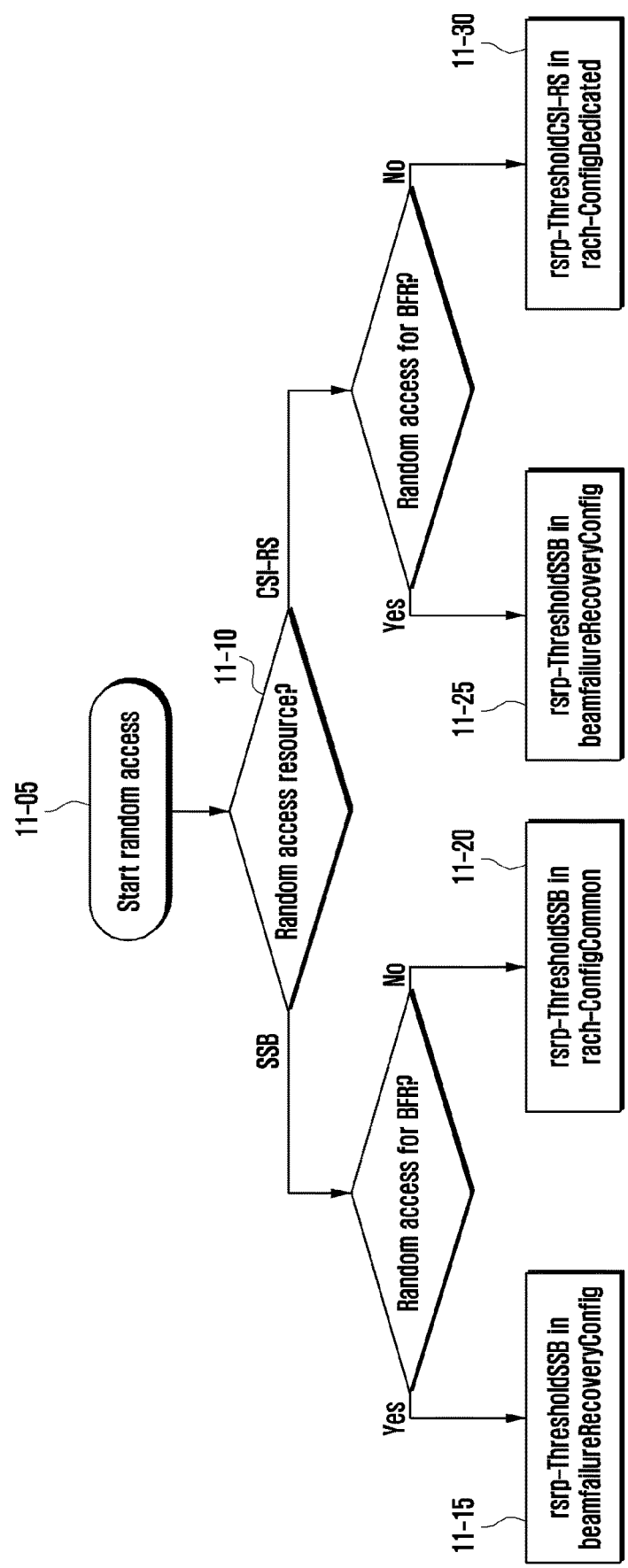
FIG. 11 is a flowchart illustrating a UE operation method for determining rsrp-Threshold that is used when selecting a random access resource in the disclosure.

FIG. 11 is a flowchart illustrating a UE operation method for determining rsrp Threshold that is used when selecting a random access resource in the disclosure.

When the random access starts (11-05), rsrp-Threshold that is used to select a random access resource may be differently configured depending on whether a random access resource candidate is SSB or CSI-RS (11-10). If the random access resource candidate is the SSB, and the random access is for beam failure recovery (BFR), the SSB resource may be selected by using the rsrp-ThresholdSSB value configured in beamfailureRecoveryConfig (11-15). If the random access resource candidate is the SSB, and the random access is not for the beam failure recovery, the SSB resource may be selected by using the rsrp-ThresholdSSB value configured in rach-ConifgCommon (11-20). If the random access resource candidate is the CSI-RS, and the random access is for the beam failure recovery, the CSI-RS resource may be selected by using the rsrp-ThresholdSSB value configured in beamfailureRecoveryConfig (11-25). If the random access resource candidate is the CSI-RS, and the random access is not for the beam failure recovery, the CSI-RS resource may be selected by using the rsrp-ThresholdCSI-RS value configured in rach-ConfigDedicated (11-30).

Figure 12:
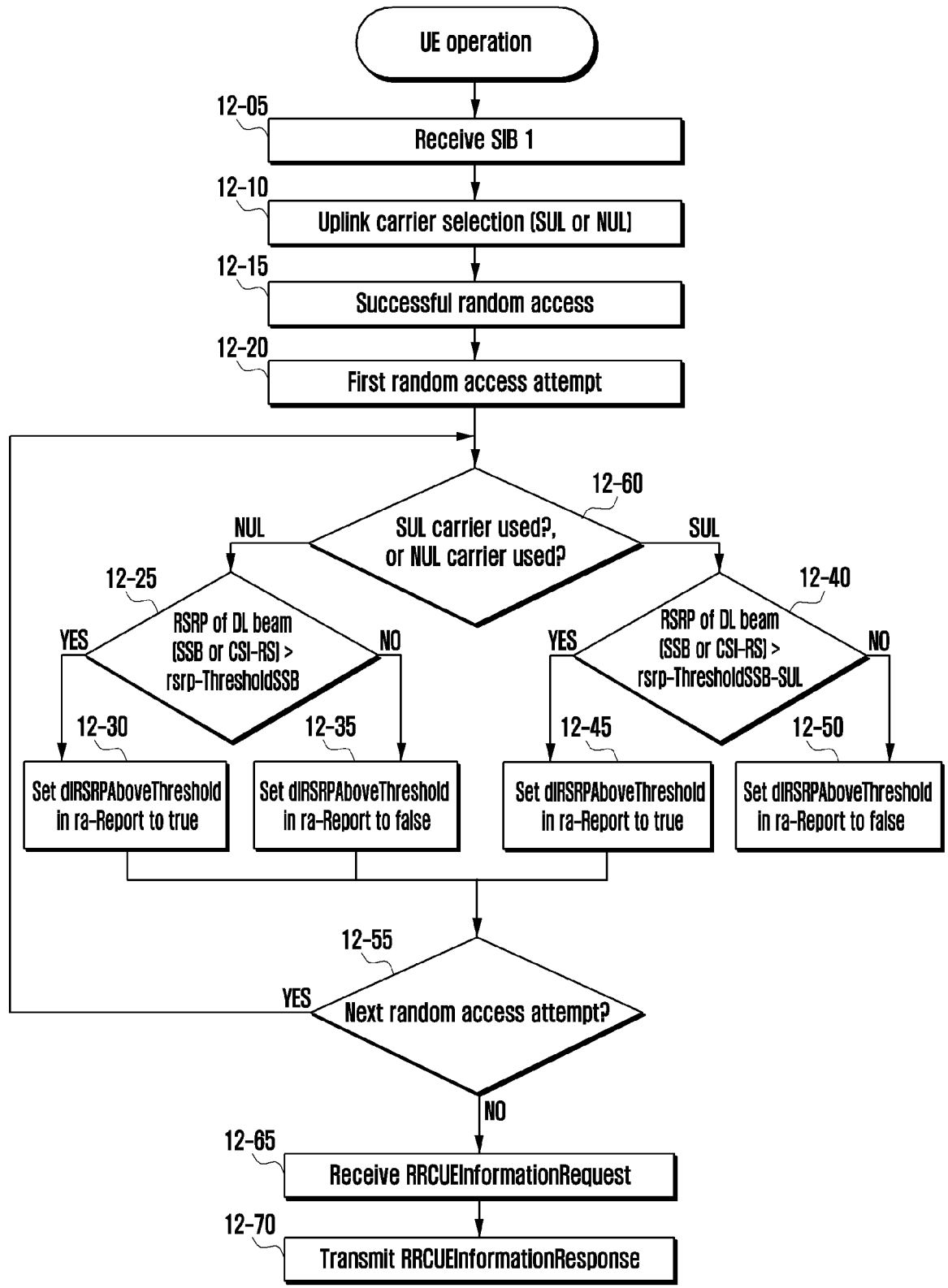
FIG. 12 is a flowchart illustrating a UE operation method for configuring dlRSRPAboveThreshold in case of a random access success in the disclosure.

FIG. 12 is a flowchart illustrating a UE operation method for configuring dlRSRPAboveThreshold in case of a random access success in the disclosure.

The UE may obtain random access information by receiving SIB1 (12-05). Before performing the random access, the UE may first calculate the RSRP of the SSB, and if the SSB RSRP value is larger than rsrp-ThresholdSSB-SUL, the UE may select the NUL carrier, whereas if not, the UE may use the SUL carrier (12-10). Thereafter, the UE may receive the DL beam (SSB or CSI-RS) in order to select the random access resource. In case of receiving the DL beam (SSB or CSI-RS), the UE may determine the rsrp-ThresholdSSB or rsrp-ThresholdCSI-RS according to FIG. 11, and may preferentially select the DL beam (SSB or CSI-RS) having the RSRP that is higher than the threshold. The UE having selected the random access resource may perform the random access through preamble transmission corresponding to the corresponding resource.

In case that the random access procedure has succeeded (12-15), the UE may store one ra-Report. In the random access procedure, more than once random access attempt (i.e., preamble transmission) exists, and a method for recording dlRSRPAboveThreshold for each random access attempt may be as follows. First, the random access attempt that is fastest in chronological order will be described (12-20). In case of the random access attempt using the NUL carrier (12-25), if the RSRP value of the DL beam (SSB or CSI-RS) is larger than the rsrp-ThresholdSSB, the dlRSRPAboveThreshold may be configured as true (12-30). If the RSRP value of the DL beam (SSB or CSI-RS) is smaller than or equal to the rsrp-ThresholdSSB, the dlRSRPAboveThreshold may be configured as false (12-35). In contrast, in case of using the SUL carrier (12-40), if the RSRP value of the DL beam (SSB or CSI-RS) is larger than the rsrp-ThresholdSSB-SUL, the dlRSRPAboveThreshold may be configured as true (12-45). If the RSRP value of the DL beam (SSB or CSI-RS) is smaller than or equal to the rsrp-ThresholdSSB-SUL, the dlRSRPAboveThreshold may be configured as false (12-50). After the dlRSRPAboveThreshold is recorded for each random access attempt, it may be identified whether there is an additional random access attempt (12-55). If there is an additional random access attempt, the operation returns to 12-60, and an operation of additionally recording the dlRSRPAboveThreshold for the access attempt may be repeatedly performed. The UE may store the ra-Report as recorded above, and if RRCUEInformationRequest is received from the base station (12-65), the UE may transmit the ra-Report information to the base station through RRCUEInformationResponse in response to the RRCUEInformationRequest (12-70).

Figure 13:
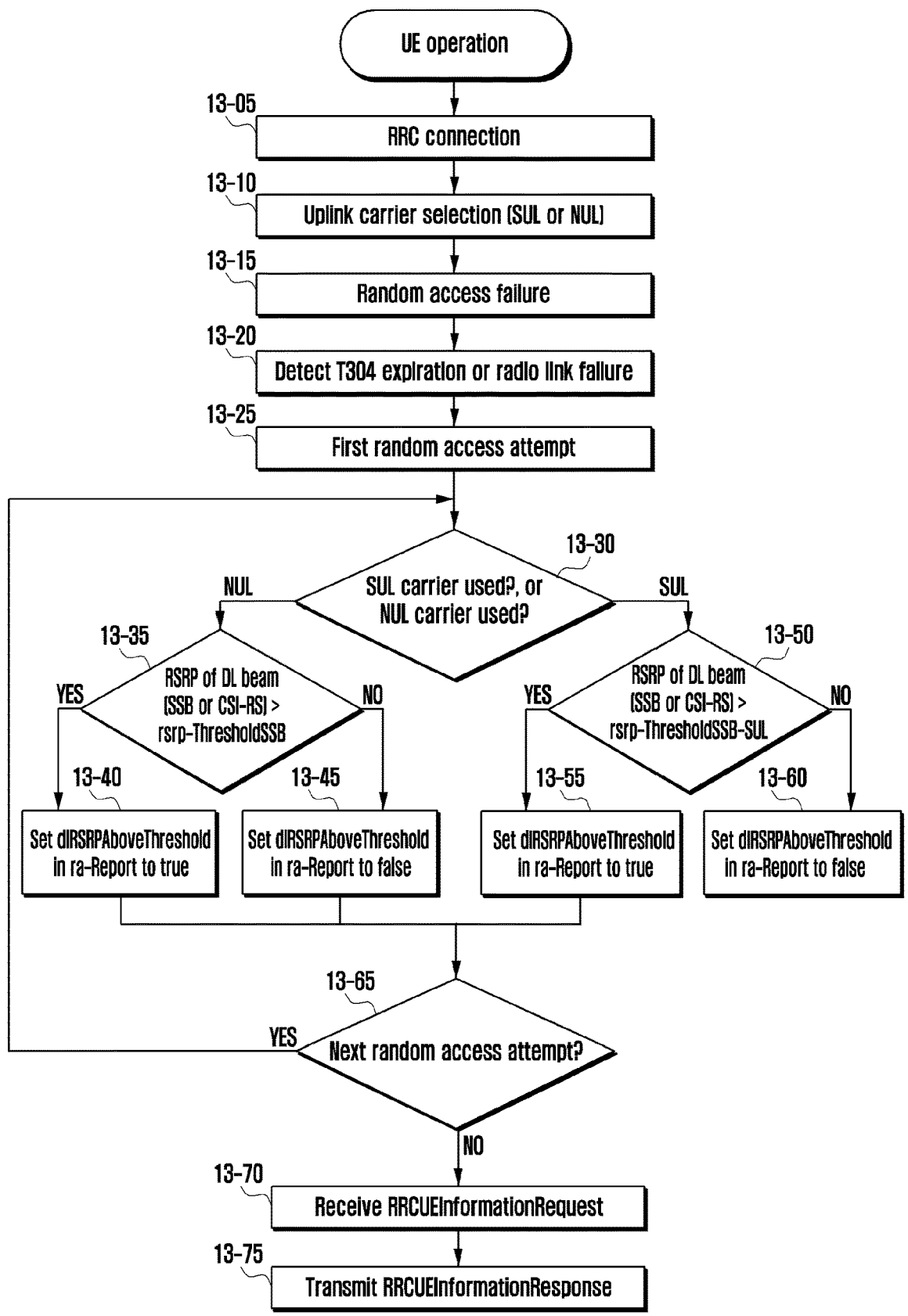
FIG. 13 is a flowchart illustrating a UE operation method for configuring dlRSRPAboveThreshold in case of a handover failure (T304 expiry) or RLF detection in the disclosure.

FIG. 13 is a flowchart illustrating a UE operation method for configuring dlRSRPAboveThreshold in case of a handover failure (T304 expiry) or RLF detection in the disclosure.

The UE may configure the RRC connection (13-05), and before performing the random access, the UE may first calculate the RSRP of the SSB. If the SSB RSRP value is larger than the rsrp-ThresholdSSB-SUL, the UE may select the NUL carrier, whereas if not, the UE may use the SUL carrier (13-10). Thereafter, the UE may receive the DL beam (SSB or CSI-RS) in order to select the random access resource. In case of receiving the DL beam (SSB or CSI-RS), the UE may determine the rsrp-ThresholdSSB or rsrp-ThresholdCSI-RS according to FIG. 11, and may preferentially select the DL beam (SSB or CSI-RS) having the RSRP that is higher than the threshold. The UE having selected the random access resource may perform the random access through the preamble transmission corresponding to the corresponding resource.

In case that the random access has failed (13-15), and the handover has failed (T304 expiry) or the RLF is detected (13-20), the UE may store the related random access procedure information in rlf-Report. In the random access procedure, more than once random access attempt (i.e., preamble transmission) exists, and a method for recording dlRSRPAboveThreshold for each random access attempt may be as follows. First, the random access attempt that is fastest in chronological order will be described (13-25). In case of using the NUL carrier (13-35), if the RSRP value of the DL beam (SSB or CSI-RS) is larger than the rsrp-ThresholdSSB, the dlRSRPAboveThreshold may be configured as true (13-40). If the RSRP value of the DL beam (SSB or CSI-RS) is smaller than or equal to the rsrp-ThresholdSSB, the dlRSRPAboveThreshold may be configured as false (13-45). In contrast, in case of using the SUL carrier (13-50), if the RSRP value of the DL beam (SSB or CSI-RS) is larger than the rsrp-ThresholdSSB-SUL, the dlRSRPAboveThreshold may be configured as true (13-55). If the RSRP value of the DL beam (SSB or CSI-RS) is smaller than or equal to the rsrp-ThresholdSSB-SUL, the dlRSRPAboveThreshold may be configured as false (13-60). After the dlRSRPAboveThreshold is recorded for each random access attempt, it may be identified whether there is an additional random access attempt (13-65). If there is an additional random access attempt, the operation returns to 13-30, and an operation of additionally recording the dlRSRPAboveThreshold for the access attempt may be repeatedly performed. The UE may store the rlf-Report as recorded above, and if RRCUEInformationRequest is received from the base station (13-70), the UE may transmit the ra-Report information to the base station through RRCUEInformationResponse in response to the RRCUEInformationRequest (13-75).

The dlRSRPAboveThreshold configuration operation in the related art as shown in FIGS. 12 and 13 has the following problems. First, since the RSRP is compared with the rsrp-Threshold determined according to FIG. 11 in order to select the random access resource, the dlRSRPAboveThreshold configuration should be performed to match FIG. 11. Second, the rsrp-ThresholdSSB-SUL is a threshold that is used when the carrier for the random access is selected (whether to use the SUL carrier or the NUL carrier). Further, the dlRSRPAboveThreshold represents a big and small relationship between the RSRP of the resource (SSB or CSI-RS) selected for the random access and the rsrp-Threshold selected in FIG. 11. Accordingly, the rsrp-ThresholdSSB-SUL should not be compared with the RSRP for the dlRSRPAboveThreshold value configuration as at 12-40 and 13-50. Third, in selecting the random access resource, the CSI-RS can be used as the random access resource only in case that the RSRP of the CSI exceeds the rsrp-Threshold-CSI-RS. Accordingly, in recording the CSI-RS based random access information, the dlRSRPAboveThreshold is always configured as true, and thus becomes non-valid information. Accordingly, the dlRSRPAboveThreshold may be used as an optional field other than a mandatory field, and in case of recording the CSI-RS based random access information, the above-described field may not be used. Fourth, in case of the SSB based random access, the contention-free random access becomes possible only in case that the RSRP of the SSB exceeds the rsrp-ThresholdSSB. Accordingly, in recording the SSB based contention-free random access information, the dlRSRPAboveThreshold is always configured as true, and thus becomes non-valid information. Accordingly, the dlRSRPAboveThreshold may be used as an optional field other than a mandatory field in both the ra-Report and the rlf-Report, and in case of recording the SSB based contention-free random access information, the above-described field may not be used.

Figure 14:
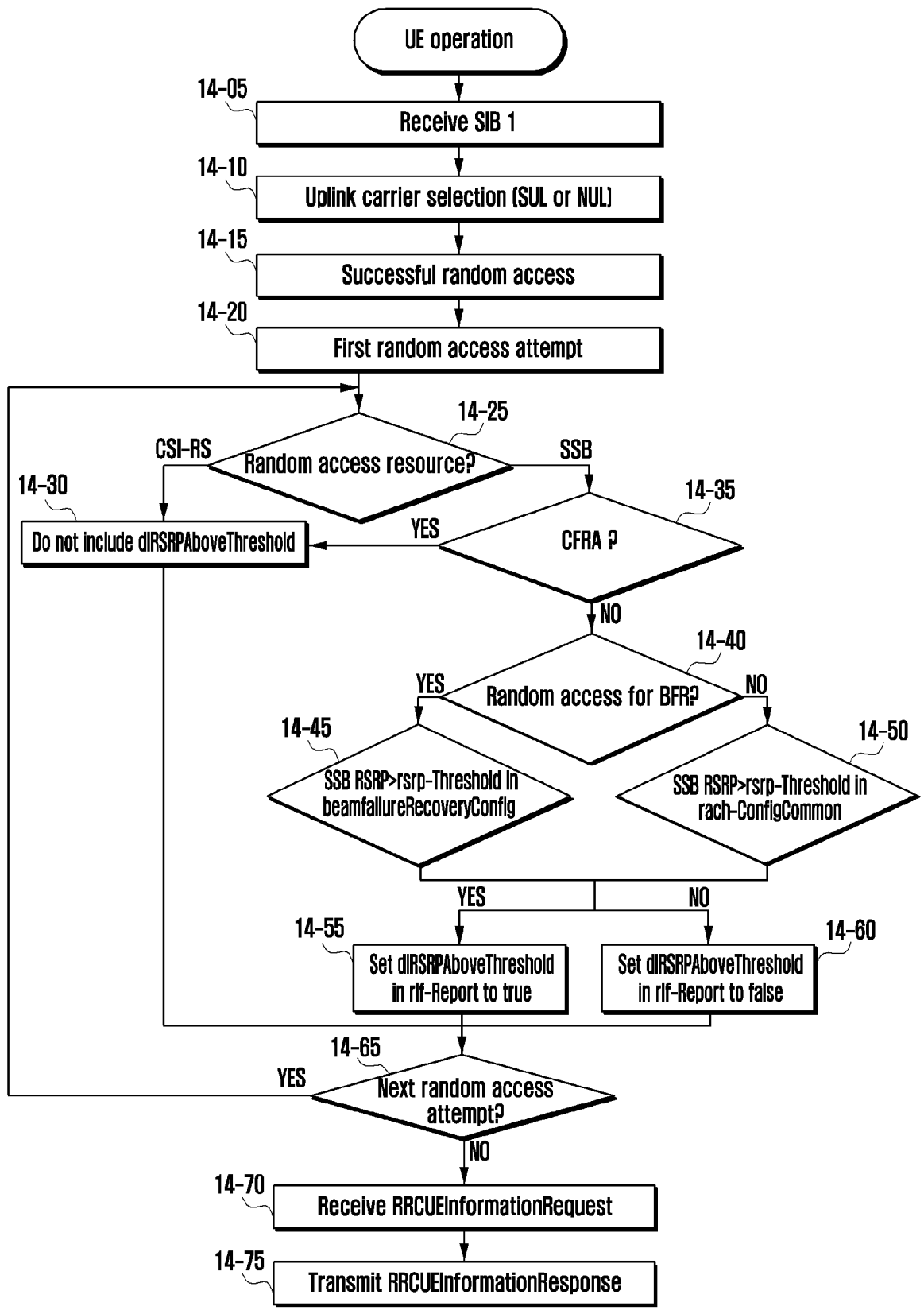
FIG. 14 is a flowchart illustrating a UE operation method for configuring dlRSRPAboveThreshold in case of a random access success proposed in the disclosure.

FIG. 14 is a flowchart illustrating a UE operation method for configuring dlRSRPAboveThreshold in case of a random access success proposed in the disclosure.

Operations 14-05 to 14-20 are the same as the operations 12-05 to 12-20.

The UE may determine whether the resource having performed the random access is CSI-RS or SSB (14-25). The UE having performed the CSI-RS based random access attempt may not include the dlRSRPAboveThreshold for the random access attempt in the ra-Report (14-30). The UE having performed the SSB based random access may determine whether the observed random access attempt is a contention-free random access (14-35). If the random access attempt is the contention-free random access attempt, the UE may not include the dlRSRPAboveThreshold for the random access attempt in the ra-Report (14-30). The UE having performed the contention-based random access by using the SSB may determine whether the random access has been performed for the beam failure recovery (14-40). If the random access has been performed for the beam failure recovery at operation 14-40, the UE may compare the rsrp-ThresholdSSB included in the beamFailureRecoveryConfig with the RSRP of the SSB (14-45). If the random access has not been performed for the beam failure recovery at operation 14-40, the UE may compare the rsrp-ThresholdSSB included in the rach-ConfigCommon with the RSRP of the SSB (14-50). If 14-50 or 14-45 is satisfied, the UE may include the dlRSRPAboveThreshold in the ra-Report, and may configure the same as true (14-55). If 14-50 or 14-45 is not satisfied, the UE may include the dlRSR-PAboveThreshold in the ra-Report, and may configure the same as false (14-95).

Operations 14-65 to 14-75 are the same as the operations 12-55 to 12-70.

Figure 15:
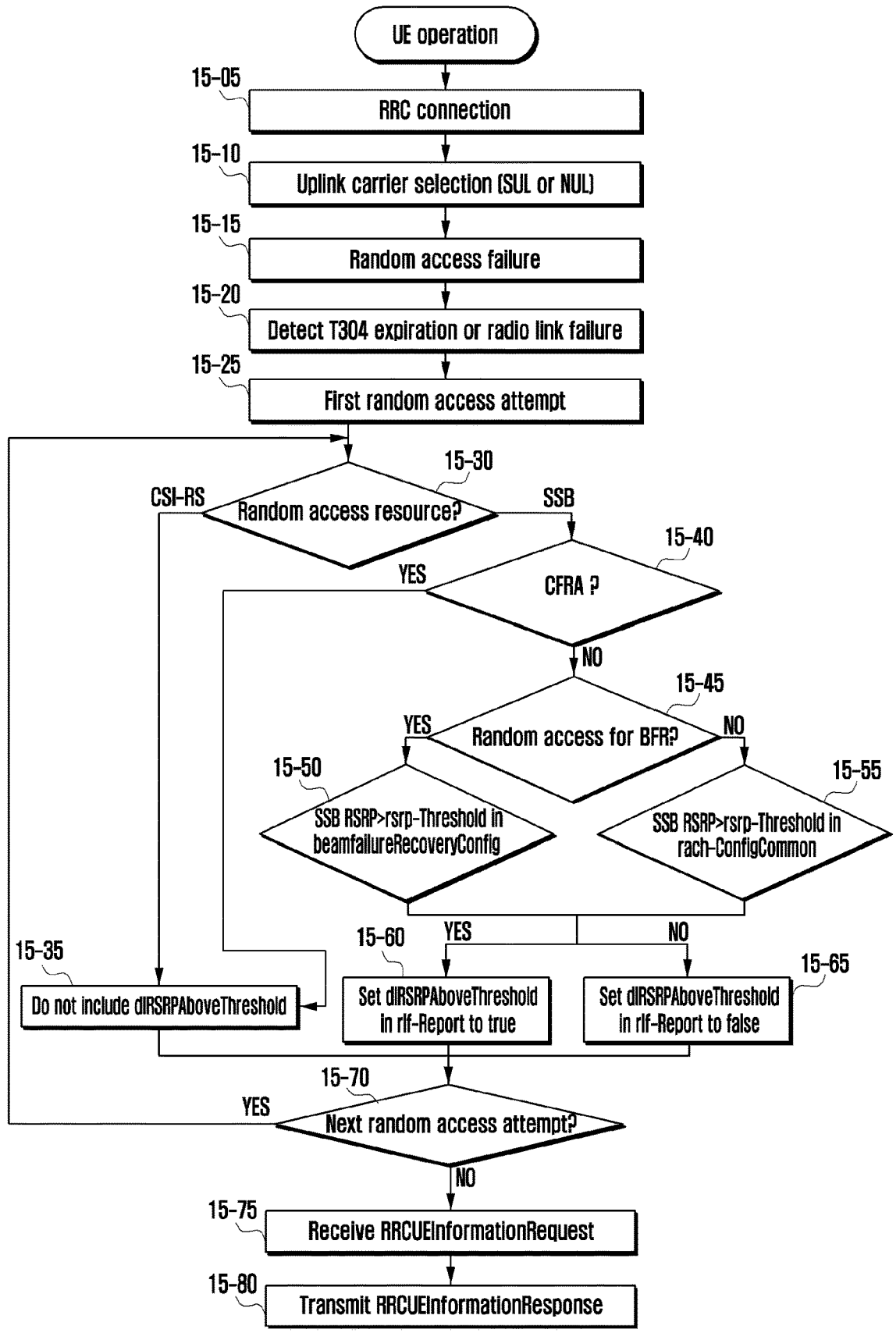
FIG. 15 is a flowchart illustrating a UE operation method for configuring dlRSRPAboveThreshold in case of a handover failure (T304 expiry) or RLF detection proposed in the disclosure.

FIG. 15 is a flowchart illustrating a UE operation method for configuring dlRSRPAboveThreshold in case of a handover failure (T304 expiry) or RLF detection proposed in the disclosure.

Operations 15-05 to 15-25 are the same as the operations 13-05 to 13-25.

Operations 15-30 to 15-80 are the same as the operations 14-25 to 14-75. However, the dlRSRPAboveThreshold described herein is referred to as a parameter belonging to the rlf-Report other than the ra-Report.

Next, as one embodiment proposed in the disclosure, the dlRSRPAboveThreshold reflecting the contents of the disclosure in FIGS. 14 and 15 will be described.

dlRSRPAboveThreshold: This field is used to indicate if SS-RSRP of selected SSB is above or below the rsrp-ThresholdSSB. For random access procedure initiated for beam failure recovery, the rsrp-ThresholdSSB rsrp-ThresholdSSB in beamFailureRecoveryConfig in UL BWP configuration of UL BWP selected for random access procedure is used to set parameter dlRSR-PAboveThreshold. Otherwise, rsrp-ThresholdSSB in rach-ConfigCommon in UL BWP configuration of UL BWP selected for random access procedure is used to set parameter dlRSRPAbobeThreshold.

Second Embodiment

Figure 16:
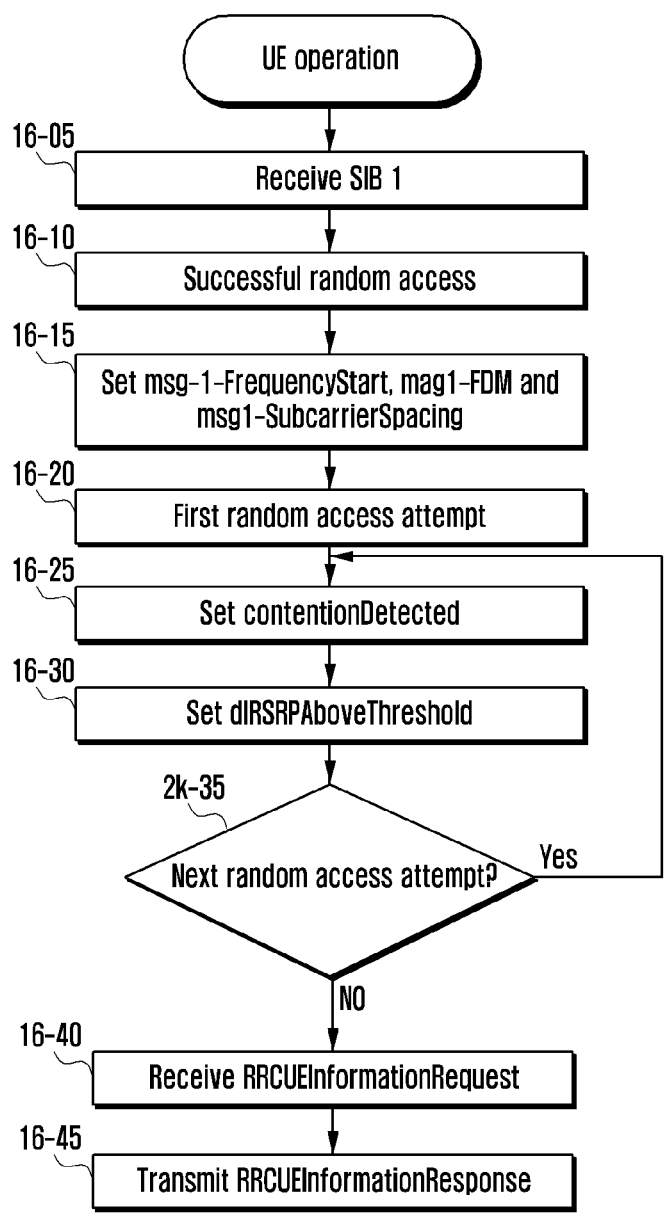
FIG. 16 is a flowchart of a UE operation of storing random access information in case of a random access success in the disclosure.

FIG. 16 is a flowchart of a UE operation of storing random access information in case of a random access success in the disclosure.

The UE receives SIB 1 and obtains random access information (16-05). In case that the random access procedure has succeeded (16-10), the UE stores one ra-Report. First, the UE configures and stores msg1-Frequency Start, msg1-FDM, and msg1-SubcarrierSpacing, which are msg1 resource information (16-15). In the random access procedure, more than once random access attempt (i.e., preamble transmission) exists, and the result of the random access attempt that is fastest in chronological order will be described (16-20). After the contentionDetected 16-25 and the dlRSRPAboveThreshold 16-30 are recorded in the random access attempt, it is identified whether there is an additional random access attempt (16-35). If there is an additional random access attempt, the operation returns to 16-25, and an operation of additionally recording the contentionDetected and the dlRSRPAboveThreshold for the access attempt is repeatedly performed. The UE may store the ra-Report as recorded above, and if RRCUEInformationRequest is received from the base station (16-40), the UE may transmit the ra-Report information to the base station through RRCUEInformationResponse in response to the RRCUEInformationRequest (16-45).

Figure 17:
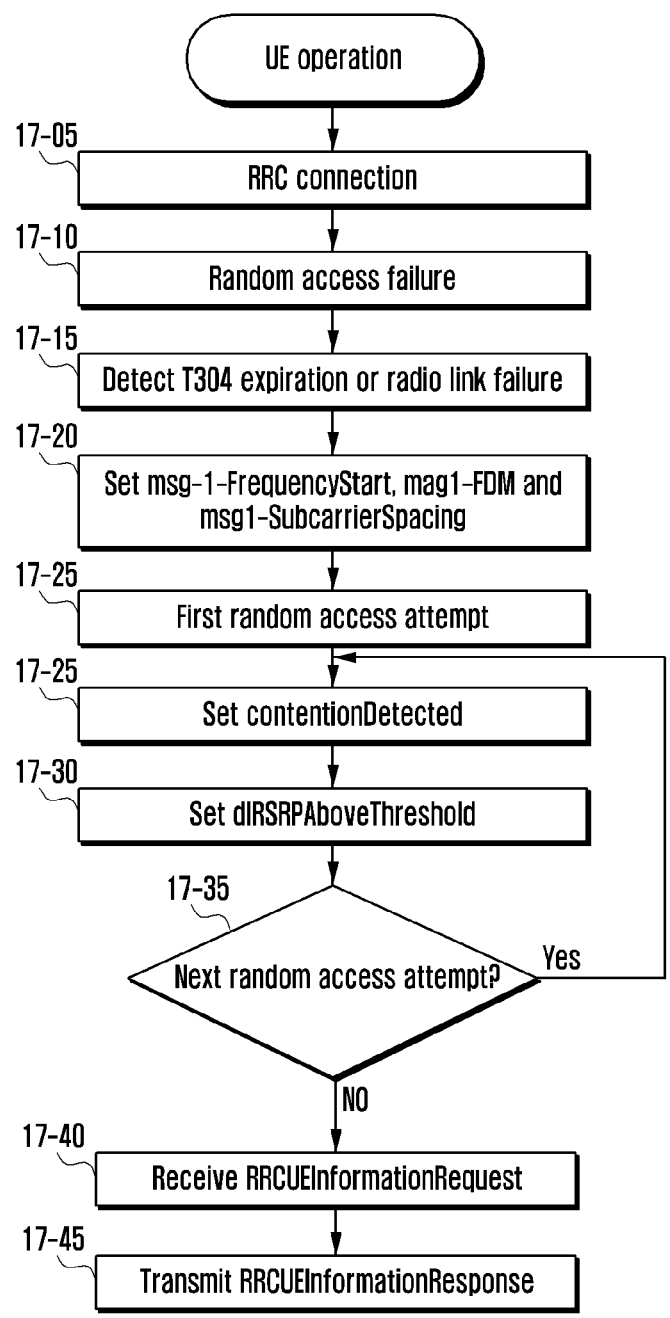
FIG. 17 is a flowchart of a UE operation of storing random access information in case of a handover failure (T304 expiry) or RLF detection in the disclosure.

FIG. 17 is a flowchart of a UE operation of storing random access information in case of a handover failure (T304 expiry) or RLF detection in the disclosure.

The UE configures the RRC connection (17-05). After the random access procedure is performed, the random access may fail (17-10). If the handover has failed (T304 expiry) or the RLF is detected (17-15), the UE stores the related random access procedure information in the rlf-Report. In the random access procedure, more than once random access attempt (i.e., preamble transmission) exists. First, the random access attempt that is fastest in chronological order will be described (17-25). After the contentionDetected 17-35 and the dlRSRPAboveThreshold 17-35 are recorded in the random access attempt in turn, it is identified whether there is an additional random access attempt (17-40). If there is an additional random access attempt, the operation returns to 17-30, and an operation of additionally recording the contentionDetected and the dlRSRPAboveThreshold for the access attempt is repeatedly performed. The UE may store the rlf-Report as recorded above, and if RRCUEInformationRequest is received from the base station (17-45), the UE may transmit the rlf-Report information to the base station through RRCUEInformationResponse in response to the RRCUEInformationRequest (17-50).

The method for recording the random access information as shown in FIGS. 16 and 17 has the following problems. First, a plural pieces of random access attempt information may be stored in random access procedure information stored in one ra-port (or one rlf-report), and each random access attempt may be a contention-based random access (CBRA) attempt or a contention-free random access (CFRA) attempt. That is, in one random access procedure information, CBRA attempt information and CFRA attempt information may coexist. Since the CBRA attempt and the CFRA attempt may use different random access resources, they may have different msg1-FrequencyStart and msg1-FDM values. However, in the related art, since only one msg1-FrequencyStart and only one msg1-FDM value can be stored in one random access procedure information, the msg1-FrequencyStart/msg1-FDM related to the CBRA attempt and the msg1-FrequencyStart/msg1-FDM related to the CFRA attempt are unable to be stored together at the same time. Accordingly, the disclosure proposes a method for separately storing the msg1-Frequency Start/msg1-FDM related to the CBRA attempt and the msg1-Frequency Start/msg1-FDM related to the CFRA attempt in the ra-Report and the rlf-Report as an embodiment.

Second, the base station transfers msg1-SubcarrierSpacing that is commonly used in a cell for the random access to the UE through RachConfigCommon. However, in addition, the base station may separately allocate the msg1-SubcarrierSpacing through BeamfailureRecovery for a case where the CFRA is performed for the beam failure recovery (BFR). In this case, the UE uses the msg1-SubcarrierSpacing of the BeamfailureRecovery instead of the msg1-SubcarrierSpacing of the RachConfigCommon when performing the CFRA for the BFR. The problem is that the CBRA attempt information and the CFRA attempt information may be simultaneously included in one random access procedure information, but only one of them can be included in the information of the msg1-SubcarrierSpacing. Accordingly, the disclosure proposes a method for separately storing the msg1-SubcarrierSpacing of the RachConfigCommon and the msg1-SubcarrierSpacing of the BeamfailureRecovery in the ra-Report and the rlf-Report.

Third, in the related art, the contentionDetected is specified as a mandatory field in the ra-Report and the rlf-Report. However, in case of the CSI-RS based random access, the contention-free random access is always specified. Accordingly, the contentionDetected is always configured as false, and thus becomes the non-valid information.

Accordingly, the disclosure proposes an embodiment in which the contentionDetected is used as the optional field, and the field is not included when the CSI-RS based random access attempt information is recorded.

Fourth, in the related art, the dlRSRPAboveThreshold is specified as a mandatory field in the ra-Report and the rlf-Report. However, in case of performing the CSI-RS based random access, the condition that the RSRP of the CSI-RS should be higher than the rsrp-ThresholdCSI-RS. Accordingly, the dlRSRPAboveThreshold is always configured as true, and thus becomes the non-valid information. Accordingly, the disclosure proposes an embodiment in which the dlRSRPAboveThreshold is used as the optional field, and the field is not included when the CSI-RS based random access attempt information is recorded.

Fifth, in the related art, the contentionDetected is specified as a mandatory field in the ra-Report and the rlf-Report. However, in case of the SSB based contention-free random access, the contentionDetected is always configured as false, and thus becomes the non-valid information.

Accordingly, the disclosure proposes an embodiment in which the contentionDetected is used as the optional field, and the field is not included when the SSB based contention-free random access attempt information is recorded.

Sixth, in the related art, the dlRSRPAboveThreshold is specified as a mandatory field in the ra-Report and the rlf-Report. However, in case of performing the SSB based contention-free random access, the condition that the RSRP of the SSB should be higher than the rsrp-ThresholdSSB. Accordingly, the dlRSRPAboveThreshold is always configured as true, and thus becomes the non-valid information. Accordingly, the disclosure proposes an embodiment in which the dlRSRPAboveThreshold is used as the optional field, and the field is not included when the SSB based random access attempt information is recorded.

Figure 18:
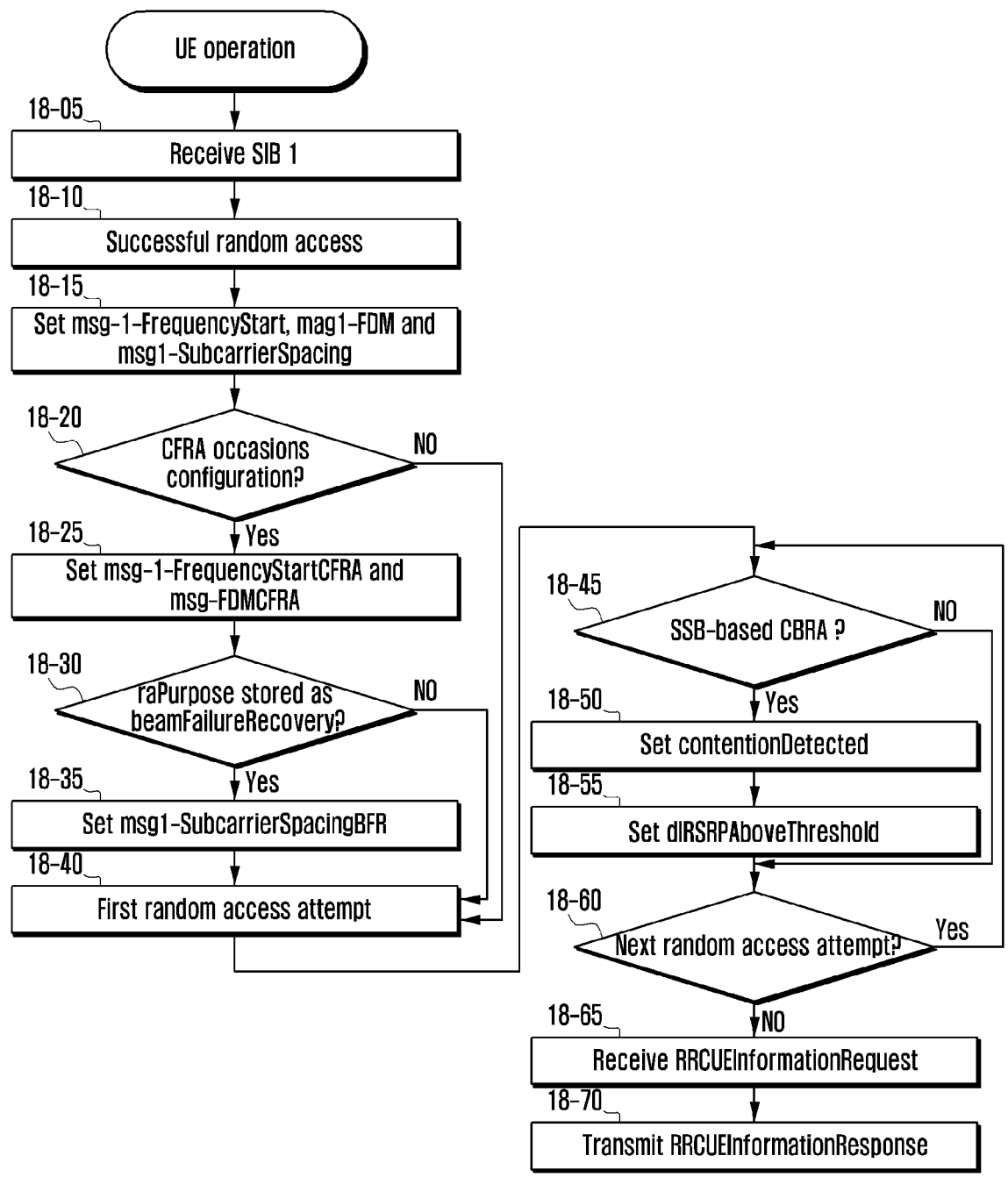
FIG. 18 is a flowchart of a UE operation of storing random access information in case of a random access success as an embodiment proposed in the disclosure.

FIG. 18 is a flowchart of a UE operation of storing random access information in case of a random access success as an embodiment proposed in the disclosure.

The UE receives (18-05) SIB1 and obtains random access information. In case that the random access procedure has succeeded (18-10), the UE stores one ra-Report. First, the UE sets and stores (18-15) msg1-FrequencyStart, msg1-FDM, and msg1-SubcarrierSpacing, which are msg1 resource information of the CBRA occasions. If the CFRA occasions are configured for the random access procedure (18-20), the UE stores (18-25) msg1-FrequencyStartCFRA and msg1-FDMCFRA as the msg1 resource information of the CFRA occasions. Thereafter, if the purpose of the random access is the beam failure recovery (18-30), the UE sets (18-35) msg1-SubcarrierSpacingBFR as msg1-SubcarrierSpacingBFR included in the BeamfailureRecovery. In the random access procedure, more than once random access attempt (i.e., preamble transmission) exists, and the result of the random access attempt that is fastest in chronological order will be described (18-40). In case of the SSB based CBRA (18-45), the contentionDetected 18-50 and the dlRSRPAboveThreshold 18-55 are recorded in the random access attempt. Thereafter, the UE identify (18-60) whether there is an additional random access attempt. If there is an additional random access attempt, the operation returns to 18-45, and an operation of determining whether to additionally record the dlRSRPAboveThreshold is repeatedly performed. The UE may store the ra-Report as recorded above, and if RRCUEInformationRequest is received (18-65) from the base station, the UE may transmit (18-70) the ra-Report information to the base station through RRCUEInformationResponse in response to the RRCUEInformationRequest.

Figure 19:
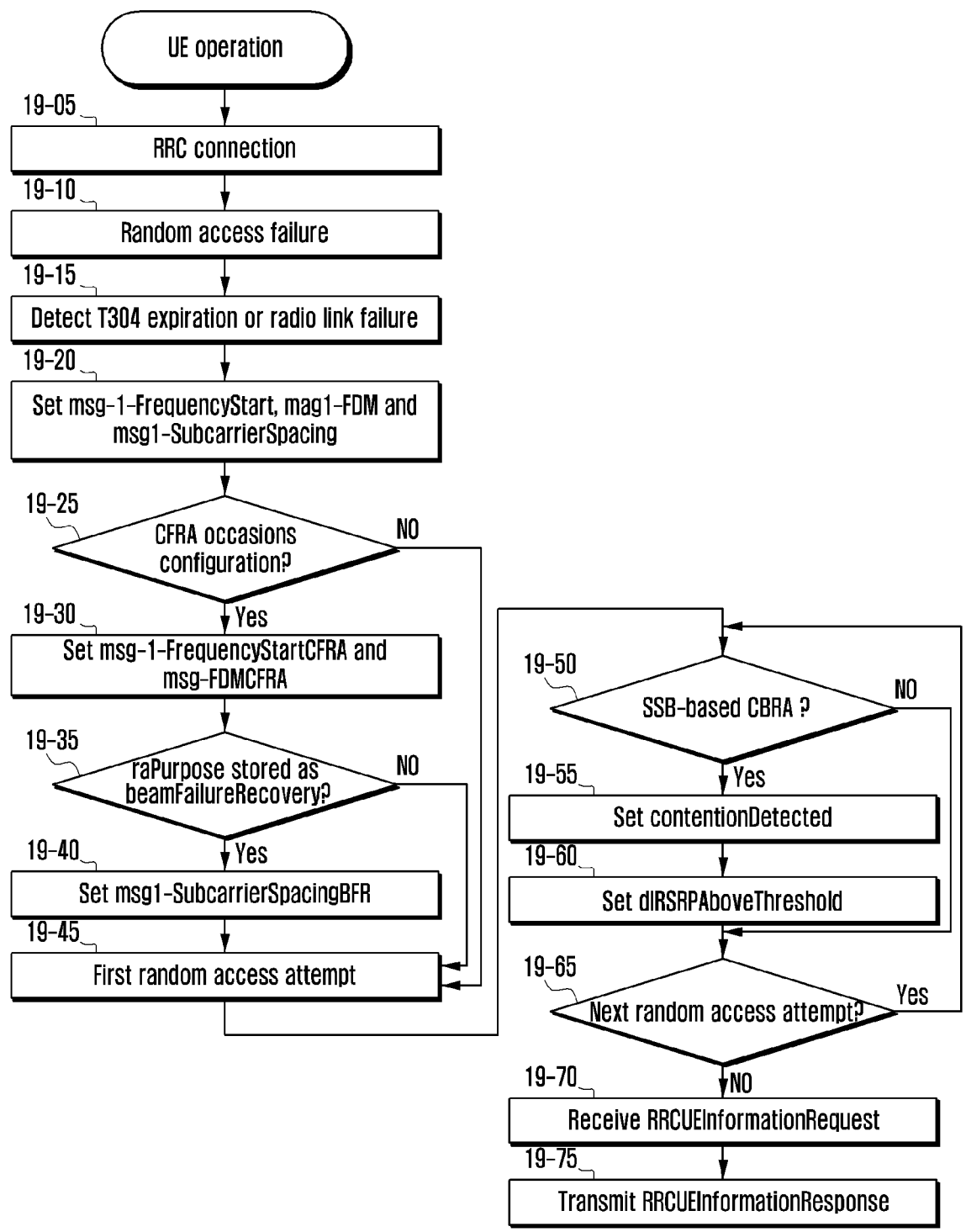
FIG. 19 is a flowchart of a UE operation of storing random access information in case of a handover failure (T304 expiry) or RLF detection as an embodiment proposed in the disclosure.

FIG. 19 is a flowchart of a UE operation of storing random access information in case of a handover failure (T304 expiry) or RLF detection as an embodiment proposed in the disclosure.

The UE configures the RRC connection (19-05). After the random access procedure is performed, the random access may fail (19-10). If the handover has failed (T304 expiry) or the RLF is detected (19-15), the UE stores the related random access procedure information in the rlf-Report. First, the UE configures and stores msg1-FrequencyStart, msg1-FDM, and msg1-SubcarrierSpacing, which are the msg1 resource information of the CBRA occasions (19-20). If the CFRA occasions are configured for the random access procedure (19-25), msg1-FrequencyStartCFRA and msg1-FDMCFRA are stored as the msg1 resource information of the CFRA occasions (19-30). Thereafter, if the cause of the rlf occurrence is the beam failure recovery failure (19-35), msg1-SubcarrierSpacingBFR is configured as msg1-SubcarrierSpacingBFR included in the BeamfailureRecovery (19-40). In the random access procedure, more than once random access attempt (i.e., preamble transmission) exists, and the result of the random access attempt that is fastest in chronological order will be described (19-45). In case of the SSB based CBRA (19-50), the contentionDetected 19-55 and the dlRSRPAboveThreshold 19-60 are recorded in turn in the random access attempt. Thereafter, it is identified whether there is an additional random access attempt (19-65). If there is an additional random access attempt, the operation returns to 19-50, and an operation of determining whether to additionally record the contentionDetected for the access attempt and the dlRSRPAboveThreshold is repeatedly performed. The UE may store the rlf-Report as recorded above, and if RRCUEInformationRequest is received from the base station (19-70), the UE may transmit the ra-Report information to the base station through RRCUEInformationResponse in response to the RRCUEInformationRequest (19-75).

The following Table 3 is a field description reflecting the contents of the disclosure in FIGS. 18 and 19.

TABLE 3 msg1-FrequencyStart
Offset of lowest contention based PRACH transmission occasion in frequency domain with respective to PRB 0 of the UL BWP.
msg1-SubcarrierSpacing
Subcarrier spacing of PRACH resources except the PRACH resources for contention free beam failure recovery.
msg1-FDM
The number of contention based PRACH transmission occasions FDMed in one time instance.
msg1-FrequencyStartCFRA
Offset of lowest contention free PRACH transmission occasion in frequency domain with respective to PRB 0 of the UL BWP.
msg1-SubcarrierSpacingBFR
Subcarrier spacing of PRACH resources for contention free beam failure recovery.
msg1-FDMCFRA
The number of contention free PRACH transmission occasions FDMed in one time instance.

Still another problem in the related art is that it is not distinguished whether each random access attempt included in the ra-Report (or rlf-Report) is CBRA or CFRA. In order to solve this problem, the disclosure proposes a method for distinguishing the CFRA or CBRA for each random access attempt.

Figure 20:
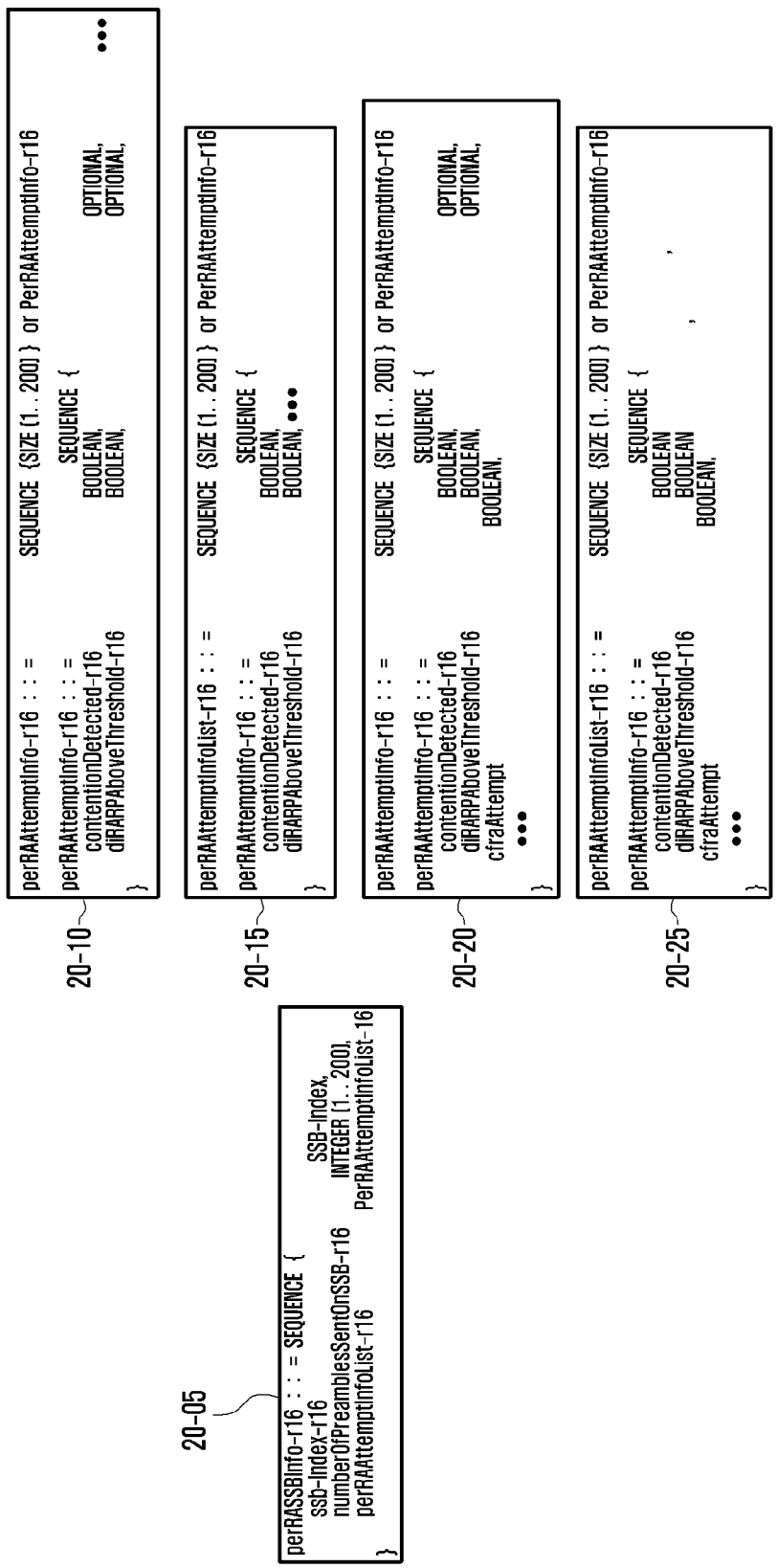
FIG. 20 illustrates an embodiment of total 4 kinds of ASN.1 structures in a method for indicating CFRA or CBRA for each random access attempt proposed in the disclosure.

FIG. 20 illustrates an embodiment of total 4 kinds of ASN.1 structures in a method for indicating CFRA or CBRA for each random access attempt proposed in the disclosure.

Since only CFRA exists in the CSI-RS based random access, the above method is not necessary with respect to PerRACSI-RSInfo. In contrast, both CBRA and CFRA are all possible in the SSB based random access, the disclosure proposes an embodiment for PerRASSBInfo.

"20-05" represents ASN.1 structure of the PerRASSBInfo. Among them, numberOfPreamblesSentOnSSB thereof represents the total number of random access attempts. That is, 20-05 represents the sum of the number of CFRA random access attempts and the number of CBRA random access attempts.

"20-10" is the first embodiment of a method for indicating CFRA or CBRA for each random access attempt, and the size of perRAAttemptInfoList is equal to that of numberOfPreamblesSentOnSSB, and contentionDetected and dlRSRPAboveThreshold are used as optional fields. If the random access attempt is CFRA, the entry of the perRAAttemptInfoList corresponding to the attempt is emptied. That is, the entry exists, but does not include both the contentionDetected and the dlRSRPAboveThreshold.

"20-15" is the second embodiment of the method for indicating the CFRA or the CBRA for each random access attempt, and the size of the perRAAttemptInfoList is equal to that of the number of CBRA random access attempts, and contentionDetected and dlRSRPAboveThreshold are used as mandatory fields. Accordingly, only in case that the random access attempt is the CBRA, the entry of the perRAAttemptInfoList corresponding to the attempt is generated, and includes both the contentionDetected and the dlRSRPAboveThreshold. In contrast, in case of the CFRA, the entry does not exist.

"20-20" is the third embodiment of the method for indicating the CFRA or the CBRA for each random access attempt, and the size of the perRAAttemptInfoList is equal to that of numberOfPreamblesSentOnSSB. Further, contentionDetected and dlRSRPAboveThreshold are used as optional fields, and 1-bit indicator cfraAttempt that explicitly represents the CFRA attempt is used as a mandatory field. Accordingly, in case of the entry of the perRAAttemptInfoList corresponding to the CFRA attempt, the contentionDetected and the dlRSRPAboveThreshold are not included, and the cfraAttempt is configured as true. In contrast, in case of the entry of the perRAAttemptInfoList corresponding to the CBRA attempt, the contentionDetected and the dlRSRPAboveThreshold are included in all, and the cfraAttempt is configured as false. As still another embodiment that is derived from the third embodiment, a method, in which the cfraAttempt is used as the optional field, instead of configuring the cfraAttempt as false, and the cfraAttempt is not included in the entry, is proposed.

"20-25" is the fourth embodiment of the method for indicating the CFRA or the CBRA for each random access attempt, and the size of the perRAAttemptInfoList is equal to that of numberOfPreamblesSentOnSSB. Further, contentionDetected and dlRSRPAboveThreshold are used as mandatory fields, and 1-bit indicator cfraAttempt that explicitly represents the CFRA attempt is also used as a mandatory field. In case of the entry of the perRAAttemptInfoList corresponding to the CFRA attempt, both the contentionDetected and the dlRSRPAboveThreshold are included, and is always configured as true, and the cfraAttempt is configured as true. In contrast, in case of the entry of the perRAAttemptInfoList corresponding to the CBRA attempt, the contentionDetected and the dlRSRPAboveThreshold are included in all, and the cfraAttempt is configured as false.

Meanwhile, among the above-described embodiments and methods in the disclosure, respective configurations or operations may be selectively joined, combined, and applied. Further, depending on configurations and/or definitions in the system, the above-described operations may not be certainly included in all, and some operations may be omitted.

Figure 21:
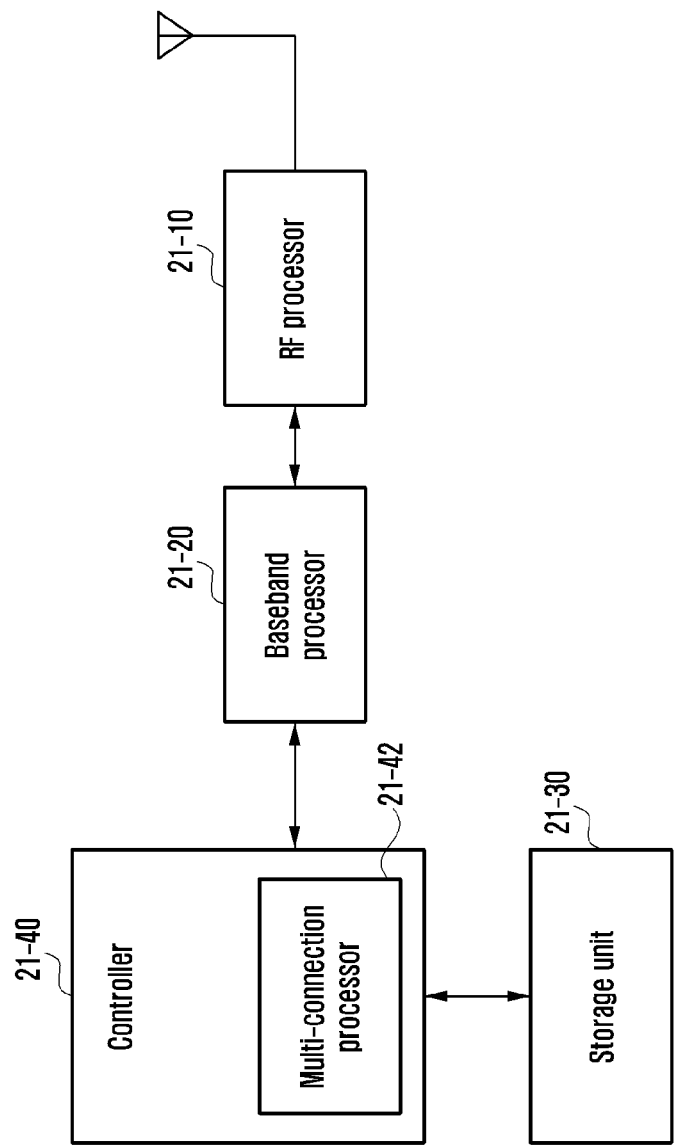
FIG. 21 is a diagram illustrating a UE device according to embodiments of the disclosure.

FIG. 21 is a diagram illustrating a UE device according to various embodiments of the disclosure.

With reference to the drawing, the UE includes a radio frequency (RF) processor 21-10, a baseband processor 21-20, a storage unit 21-30, and a controller 21-40.

The RF processor 21-10 performs a function for transmitting and receiving a signal on a radio channel, such as signal band conversion and amplification. That is, the RF processor 21-10 performs up-conversion of a baseband signal provided from the baseband processor 21-20 into an RF-band signal to transmit the converted signal through an antenna, and performs down-conversion of the RF-band signal received through the antenna into a baseband signal. For example, the RF processor 21-10 may include a transmission filter, a reception filter, an amplifier, a mixer, an oscillator, a digital-to-analog converter (DAC), and an analog-to-digital converter (ADC). Although only one antenna is illustrated in FIG. 21, the UE may be provided with a plurality of antennas. Further, the RF processor 21-10 may include a plurality of RF chains. Further, the RF processor 21-10 may perform beamforming. For the beamforming, the RF processor 21-10 may adjust phases and sizes of signals transmitted or received through the plurality of antennas or antenna elements. Further, the RF processor 21-10 may perform MIMO, and may receive several layers during performing of the MIMO operation.

The baseband processor 21-20 performs a conversion function between a baseband signal and a bit string in accordance with the physical layer standard of the system. For example, during data transmission, the baseband processor 21-20 generates complex symbols by encoding and modulating a transmitted bit string. Further, during data reception, the baseband processor 21-20 restores a received bit string by demodulating and decoding the baseband signal provided from the RF processor 21-10. For example, in case of following an orthogonal frequency division multiplexing (OFDM) method, during data transmission, the baseband processor 21-20 generates complex symbols by encoding and modulating a transmitted bit string, performs mapping of the complex symbols onto subcarriers, and then configures OFDM symbols through the inverse fast Fourier transform (IFFT) operation and cyclic prefix (CP) insertion. Further, during data reception, the baseband processor 21-20 divides the baseband signal being provided from the RF processor 21-10 in the unit of OFDM symbols, restores the signals mapped onto the subcarriers through the fast Fourier transform (FFT) operation, and then restores the received bit string through demodulation and decoding.

The baseband processor 21-20 and the RF processor 21-10 transmit and receive the signals as described above. Accordingly, the baseband processor 21-20 and the RF processor 21-10 may be called a transmitter, a receiver, a transceiver, or a communication unit. Further, in order to support different radio access technologies, at least one of the baseband processor 21-20 and the RF processor 21-10 may include a plurality of communication modules. Further, in order to process signals of different frequency bands, at least one of the baseband processor 21-20 and the RF processor 21-10 may include different communication modules. For example, the different radio access technologies may include a wireless LAN (e.g., IEEE 802.11) and a cellular network (e.g., LTE). Further, the different frequency bands may include super high frequency (SHF) (e.g., 2.NR Hz or NR Hz) band and millimeter wave (e.g., 60 GHz) band.

The storage unit 21-30 stores therein a basic program for an operation of the UE, application programs, and data of configuration information. In particular, the storage unit 21-30 may store information related to a second access node performing wireless communication using second radio access technology. Further, the storage unit 21-30 provides stored data in accordance with a request from the controller 21-40. For example, according to an embodiment of the disclosure, the storage unit 21-30 may store first resource information related to a contention-based random access (CBRA) and second resource information related to contention-free random access (CFRA).

The controller 21-40 controls the overall operation of the UE. For example, the controller 21-40 transmits and receives signals through the baseband processor 21-20 and the RF processor 21-10. Further, the controller 21-40 records or reads data in or from the storage unit 21-30. For this, the controller 21-40 may include at least one processor. For example, the controller 21-40 may include a communication processor (CP) performing a control for communication and an application processor (AP) controlling a higher layer, such as an application program. For example, according to an embodiment of the disclosure, the controller 21-40 may control to store first resource information related to a contention-based random access (CBRA) and second resource information related to contention-free random access (CFRA) in the memory 21-30, and may control the transceiver 21-10 and 21-20 to receive a first message for requesting random access related information of a UE from the base station, and may control the transceiver 21-10 and 21-20 to transmit a second message including the stored first resource information and the stored second resource information to the base station in response to the first message.

Figure 22:
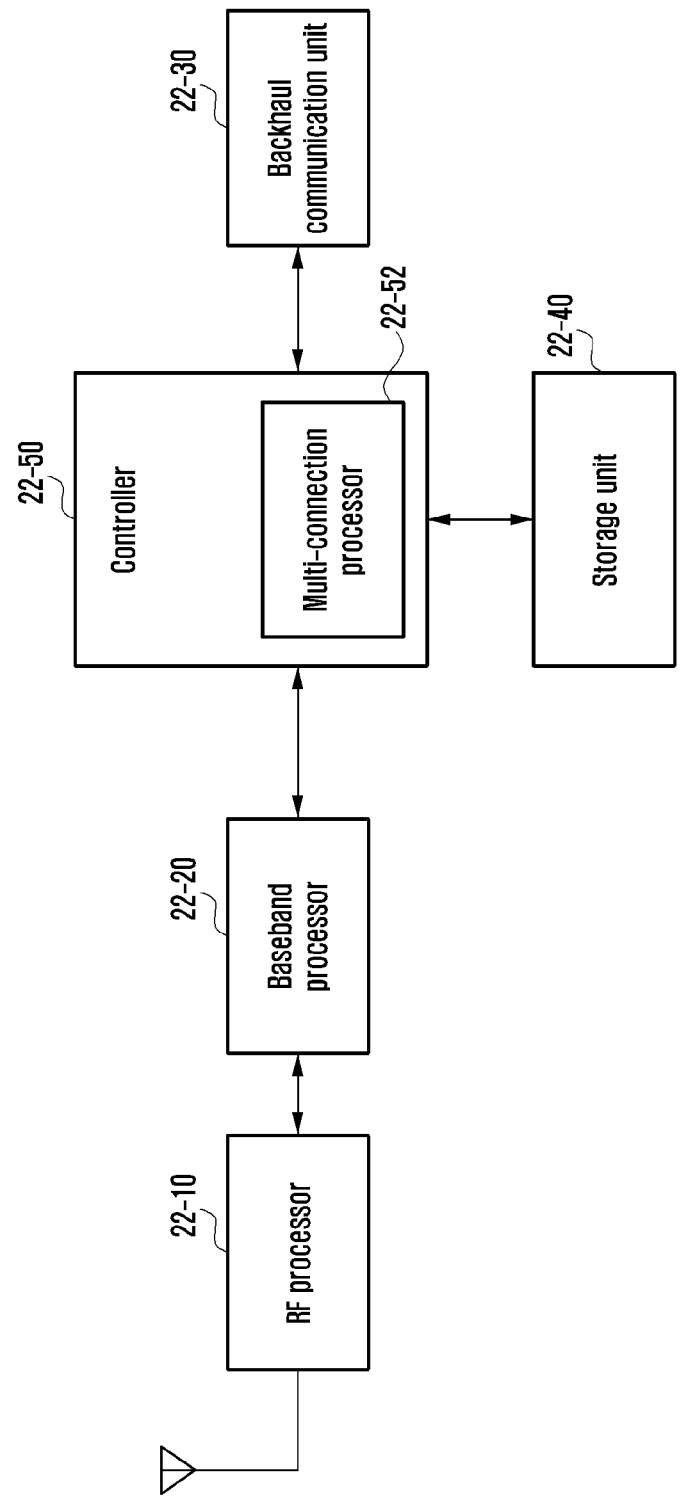
FIG. 22 is a diagram illustrating a base station device according to embodiments of the disclosure.

FIG. 22 is a diagram illustrating a base station device according to embodiments of the disclosure.

As illustrated in the drawing, a base station is configured to include an RF processor 22-10, a baseband processor 22-20, a backhaul communication unit 22-30, a storage unit 22-40, and a controller 22-50.

The RF processor 22-10 performs a function for transmitting and receiving a signal on a radio channel, such as signal band conversion and amplification. That is, the RF processor 22-10 performs up-conversion of a baseband signal provided from the baseband processor 22-20 into an RF-band signal to transmit the converted signal through an antenna, and performs down-conversion of the RF-band signal received through the antenna into a baseband signal. For example, the RF processor 22-10 may include a transmission filter, a reception filter, an amplifier, a mixer, an oscillator, a DAC, and an ADC. Although only one antenna is illustrated in the drawing, the first access node may be provided with a plurality of antennas. Further, the RF processor 22-10 may include a plurality of RF chains. Further, the RF processor 22-10 may perform beamforming. For the beamforming, the RF processor 22-10 may adjust phases and sizes of signals transmitted or received through the plurality of antennas or antenna elements. The RF processor 22-10 may perform down MIMO operation through transmission of one or more layers.

The baseband processor 22-20 performs a conversion function between a baseband signal and a bit string in accordance with the physical layer standard of the first radio access technology. For example, during data transmission, the baseband processor 22-20 generates complex symbols by encoding and modulating a transmitted bit string. Further, during data reception, the baseband processor 22-20 restores a received bit string by demodulating and decoding the baseband signal provided from the RF processor 22-10. For example, in case of following an OFDM method, during data transmission, the baseband processor 22-20 generates complex symbols by encoding and modulating a transmitted bit string, performs mapping of the complex symbols to subcarriers, and then configures OFDM symbols through the IFFT operation and CP insertion. Further, during data reception, the baseband processor 22-20 divides the baseband signal provided from the RF processor 22-10 in the unit of OFDM symbols, restores the signals mapped to the subcarriers through the FFT operation, and then restores the received bit string through demodulation and decoding. The baseband processor 22-20 and the RF processor 22-10 transmit and receive the signals as described above. Accordingly, the baseband processor 22-20 and the RF processor 22-10 may be called a transmitter, a receiver, a transceiver, a communication unit, or a wireless communication unit.

The backhaul communication unit 22-30 provides an interface for performing communication with other nodes in the network. That is, the backhaul communication unit 22-30 converts a bit string being transmitted from the primary base station to other nodes, for example, an auxiliary base station and a core network, into a physical signal, and converts the physical signal being received from other nodes into a bit string.

The storage unit 22-40 stores therein a basic program for an operation of the primary base station, application programs, and data of configuration information. In particular, the storage unit 22-40 may store information on a bearer allocated to the connected UE and the measurement result reported from the connected UE. Further, the storage unit 22-40 may store information that becomes a basis of determination whether to provide or suspend a multi-connection to the UE. Further, the storage unit 22-40 provides stored data in accordance with a request from the controller 22-50.

The controller 22-50 controls the overall operation of the primary base station. For example, the controller 22-50 transmits and receives signals through the baseband processor 22-20 and the RF processor 22-10 or through the backhaul communication unit 22-30. Further, the controller 22-50 records or reads data in or from the storage unit 22-40. For this, the controller 22-50 may include at least one processor. For example, according to an embodiment of the disclosure, the controller 22-50 may control the transceiver 22-10 and 22-20 to transmit a first message for requesting random access related information of a UE to the UE, and may control the transceiver 22-10 and 22-20 to receive a second message including first resource information related to a contention-based random access (CBRA) and second resource information related to a contention-free random access (CFRA) from the UE in response to the first message.

Embodiments of the disclosure that are described in the specification and drawings are merely for easy explanation of the technical contents of the disclosure and proposal of specific examples to help understanding of the disclosure, but are not intended to limit the scope of the disclosure. It will be apparent to those of ordinary skill in the art to which the disclosure pertains that other modified examples that are based on the technical idea of the disclosure can be embodied in addition to the embodiments disclosed herein.

The invention claimed is:

1. A method performed by a terminal in a wireless communication system, the method comprising:
based on successful completion of a random access procedure:
setting, in an ra-report, first information on at least one message 1 related parameter associated with at least one contention-based random access (CBRA) attempt, the at least one CBRA attempt being performed in the random access procedure; and
setting, in the ra-report, second information on at least one message 1 related parameter associated with at least one contention-free random access (CFRA) attempt, the at least one CFRA attempt being performed in the random access procedure;
receiving, from a base station, a first message for requesting information of the terminal; and
transmitting, to the base station, a second message including the ra-report, in response to the first message.

2. The method of claim 1, wherein the first information includes at least one of frequency domain offset information of a physical random access channel (PRACH) transmission occasion associated with the at least one CBRA attempt, subcarrier spacing information associated with the at least one CBRA attempt, or information on a number of frequency division multiplexed (FDMed) PRACH transmission occasions associated with the at least one CBRA attempt.

3. The method of claim 1, wherein the second information includes at least one of frequency domain offset information of a physical random access channel (PRACH) transmission occasion associated with the at least one CFRA attempt, subcarrier spacing information associated with the at least one CFRA attempt, or information on a number of frequency division multiplexed (FDMed) PRACH transmission occasions associated with the at least one CFRA attempt.

4. The method of claim 1, further comprising:
based on successful completion of a random access procedure, setting, in the ra-report, third information on at least one parameter associated with individual random access attempt in chronological order of attempts in the random access procedure,
wherein the third information includes an indicator indicating whether a received signal strength of a synchronization signal block (SSB) corresponding to a random access resource for each CBRA attempt exceeds a threshold value,
wherein in case that the random access procedure is for a beam failure recovery, the threshold value is configured based on configuration information for the beam failure recovery, and
wherein in case that the random access procedure is not for the beam failure recovery, the threshold value is configured based on cell-specific random access configuration information.

5. A method performed by a base station in a wireless communication system, the method comprising:
transmitting, to a terminal, a first message for requesting information of the terminal; and
receiving, from the terminal, a second message including an ra-report associated with successful completion of a random access procedure, in response to the first message,
wherein the ra-report includes:
first information on at least one message 1 related parameter associated with at least one contention-based random access (CBRA) attempt, the at least one CBRA attempt being performed in the random access procedure, and
second information on at least one message 1 related parameter associated with at least one contention-free random access (CFRA) attempt, the at least one CFRA attempt being performed in the random access procedure.

6. The method of claim 5, wherein the first information includes at least one of frequency domain offset information of a physical random access channel (PRACH) transmission occasion associated with the at least one CBRA attempt, subcarrier spacing information associated with the at least one CBRA attempt, or information on a number of frequency division multiplexed (FDMed) PRACH transmission occasions associated with the at least one CBRA attempt, and
wherein the second information includes at least one of frequency domain offset information of a PRACH transmission occasion associated with the at least one CFRA attempt, subcarrier spacing information associated with the at least one CFRA attempt, or information on a number of FDMed PRACH transmission occasions associated with the at least one CFRA attempt.

7. The method of claim 5, wherein the ra-report further includes third information on at least one parameter associated with individual random access attempt in chronological order of attempts in the random access procedure,
wherein the third information includes an indicator indicating whether a received signal strength of a synchronization signal block (SSB) corresponding to a random access resource for each CBRA attempt exceeds a threshold value,
wherein in case that to the random access procedure is for a beam failure recovery, the threshold value is configured based on configuration information for the beam failure recovery, and
wherein in case that the random access procedure is not for the beam failure recovery, the threshold value is configured based on cell-specific random access configuration information.

8. A terminal in a wireless communication system, the terminal comprising:
a transceiver; and
a controller configured to:
based on successful completion of a random access procedure:
set, in an ra-report, first information on at least one message 1 related parameter associated with at least one contention-based random access (CBRA) attempt, the at least one CBRA attempt being performed in the random access procedure, and
set, in the ra-report, second information on at least one message 1 related parameter associated with at least one contention-free random access (CFRA) attempt, the at least one CFRA attempt being performed in the random access procedure, receive, from a base station via the transceiver, a first message for requesting information of the terminal, and transmit, to the base station via the transceiver, a second message including the ra-report, in response to the first message.

9. The terminal of claim 8, wherein the first information includes at least one of frequency domain offset information of a physical random access channel (PRACH) transmission occasion associated with the at least one CBRA attempt, subcarrier spacing information associated with the at least one CBRA attempt, or information on a number of frequency division multiplexed (FDMed) PRACH transmission occasions associated with the at least one CBRA attempt.

10. The terminal of claim 8, wherein the second information includes at least one of frequency domain offset information of a physical random access channel (PRACH) transmission occasion associated with the at least one CFRA attempt, subcarrier spacing information associated with the at least one CFRA attempt, or information on a number of frequency division multiplexed (FDMed) PRACH transmission occasions associated with the at least one CFRA attempt.

11. The terminal of claim 8, wherein the controller is further configured to:

based on successful completion of a random access procedure, set, in the ra-report, third information on at least one parameter associated with individual random access attempt in chronological order of attempts in the random access procedure, wherein the third information includes an indicator indicating whether a received signal strength of a synchronization signal block (SSB) corresponding to a random access resource for each CBRA attempt exceeds a threshold value, wherein in case that the random access procedure is for a beam failure recovery, the threshold value is configured based on configuration information for the beam failure recovery, and wherein in case that the random access procedure is not for the beam failure recovery, the threshold value is configured based on cell-specific random access configuration information.

12. A base station in a wireless communication system, the base station comprising:

a transceiver; and a controller configured to:

transmit, to a terminal via the transceiver, a first message for requesting information of the terminal, and receive, from the terminal via the transceiver, a second message including an ra-report associated with successful completion of a random access procedure, in response to the first message, wherein the ra-report includes:

first information on at least one message 1 related parameter associated with at least one contention-based random access (CBRA) attempt, the at least one CBRA attempt being performed in the random access procedure, and second information on at least one message 1 related parameter associated with at least one contention-free random access (CFRA) attempt, the at least one CFRA attempt being performed in the random access procedure.

13. The base station of claim 12, wherein the first resource information includes at least one of frequency domain offset information of a physical random access channel (PRACH) transmission occasion associated with the at least one CBRA attempt, subcarrier spacing information associated with the at least one CBRA attempt, or information on a number of frequency division multiplexed (FDMed) PRACH transmission occasions associated with the at least one CBRA attempt.

14. The base station of claim 12, wherein the second information includes at least one of frequency domain offset information of a physical random access channel (PRACH) transmission occasion associated with the at least one CFRA attempt, subcarrier spacing information associated with the at least one CFRA attempt, or information on a number of frequency division multiplexed (FDMed) PRACH transmission occasions associated with the at least one CFRA attempt.

15. The base station of claim 12, wherein the ra-report further includes third information on at least one parameter associated with individual random access attempt in chronological order of attempts in the random access procedure, wherein the third information includes an indicator indicating whether a received signal strength of a synchronization signal block (SSB) corresponding to a random access resource for each CBRA attempt exceeds a threshold value, wherein in case that to the random access procedure is for a beam failure recovery, the threshold value is configured based on configuration information for the beam failure recovery, and wherein in case that the random access procedure is not for the beam failure recovery, the threshold value is configured based on cell-specific random access configuration information.

* * * * *